United States Patent
Keller et al.

(10) Patent No.: US 6,888,843 B2
(45) Date of Patent: May 3, 2005

(54) RESPONSE VIRTUAL CHANNEL FOR HANDLING ALL RESPONSES

(75) Inventors: James B. Keller, Palo Alto, CA (US); Derrick R. Meyer, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 36 days.

(21) Appl. No.: 09/398,624

(22) Filed: Sep. 17, 1999

(65) Prior Publication Data
US 2003/0095557 A1 May 22, 2003

(51) Int. Cl.$^7$ .............................................. H04L 12/54
(52) U.S. Cl. ................................... 370/429; 370/438
(58) Field of Search ............................... 370/235, 236, 370/250, 251–253, 400, 410, 412, 413, 415, 417, 428, 429, 438, 439, 443, 431, 419, 437, 212, 238, 227; 710/114, 116, 34, 315, 33, 38, 56, 52; 711/147, 6; 709/201, 400; 712/4, 28–30

(56) References Cited

U.S. PATENT DOCUMENTS

| | | | | |
|---|---|---|---|---|
| 4,905,231 A | * | 2/1990 | Leung et al. | 370/400 |
| 5,495,619 A | | 2/1996 | May et al. | |
| 5,533,198 A | | 7/1996 | Thorson | |
| 5,583,990 A | * | 12/1996 | Birrittella et al. | 712/29 |
| 5,613,129 A | | 3/1997 | Walsh | |
| 5,659,796 A | | 8/1997 | Thorson et al. | |
| 5,748,900 A | * | 5/1998 | Scott et al. | 709/235 |
| 5,749,095 A | | 5/1998 | Hagersten | |

(Continued)

FOREIGN PATENT DOCUMENTS

| | | |
|---|---|---|
| EP | 841 617 | 5/1998 |
| EP | 953 913 | 11/1999 |
| GB | 2 360 168 | 9/2001 |
| WO | 93/23810 | 11/1993 |

OTHER PUBLICATIONS

Adve et al., "Performance Analysis of Mesh Interconnection Networks with Deterministic Routing," 1994, pp. 1–40.

"Distributed, Deadlock–Free Routing in Faulty, Pipelined, Direct Interconnections Networks," Patrick T. Gaughan, et al., IEEE, 1996, 16 pages.

*Primary Examiner*—Kwang Bin Yao
(74) *Attorney, Agent, or Firm*—Lawrence J. Merkel; Meyertons, Hood, Kivlin, Kowert & Goetzel, P.C.

(57) ABSTRACT

A computer system employs virtual channels and allocates different resources to the virtual channels. Packets which do not have logical/protocol-related conflicts are grouped into a virtual channel. Accordingly, logical conflicts occur between packets in separate virtual channels. The packets within a virtual channel may share resources (and hence experience resource conflicts), but the packets within different virtual channels may not share resources. Since packets which may experience resource conflicts do not experience logical conflicts, and since packets which may experience logical conflicts do not experience resource conflicts, deadlock-free operation may be achieved. Additionally, nodes within the computer system may be configured to preallocate resources to process response packets. Some response packets may have logical conflicts with other response packets, and hence would normally not be allocable to the same virtual channel. However, by preallocating response-processing resources, response packets are accepted by the destination node. Thus, any resource conflicts which may occur are temporary (as the response packets which make forward progress are processable). Viewed in another way, response packets may be logically independent if the destination node is capable of processing the response packets upon receipt. Accordingly, a response virtual channel is formed to which each response packet belongs.

39 Claims, 24 Drawing Sheets

U.S. PATENT DOCUMENTS

| | | | |
|---|---|---|---|
| 5,754,789 A | | 5/1998 | Nowatzyk et al. |
| 5,797,035 A | * | 8/1998 | Birrittella et al. ............. 710/35 |
| 5,848,068 A | * | 12/1998 | Daniel et al. .......... 370/395.43 |
| 5,850,395 A | | 12/1998 | Hauser et al. |
| 5,870,384 A | | 2/1999 | Salovuori et al. |
| 5,892,923 A | | 4/1999 | Yasuda et al. |
| 5,936,956 A | | 8/1999 | Naven |
| 6,005,851 A | * | 12/1999 | Craddock et al. ........... 370/329 |
| 6,014,690 A | | 1/2000 | VanDoren et al. |
| 6,055,618 A | | 4/2000 | Thorson |
| 6,094,686 A | | 7/2000 | Sharma |
| 6,101,420 A | | 8/2000 | VanDoren et al. |
| 6,122,700 A | | 9/2000 | McCoy |
| 6,157,967 A | * | 12/2000 | Horst et al. .................... 710/19 |
| 6,205,508 B1 | * | 3/2001 | Bailey et al. ............... 710/260 |
| 6,243,781 B1 | | 6/2001 | Gandhi et al. |
| 6,256,674 B1 | * | 7/2001 | Manning et al. ............ 709/232 |
| 6,279,084 B1 | * | 8/2001 | VanDoren et al. .......... 711/141 |
| 6,370,600 B1 | * | 4/2002 | Hughes et al. ................ 710/29 |
| 6,370,621 B1 | * | 4/2002 | Keller ........................ 711/141 |
| 6,389,526 B1 | * | 5/2002 | Keller et al. .................. 712/30 |
| 6,426,957 B1 | | 7/2002 | Hauser et al. |
| 6,484,220 B1 | * | 11/2002 | Alvarez et al. ............... 710/46 |
| 6,715,055 B1 | | 3/2004 | Hughes |
| 2001/0044874 A1 | * | 11/2001 | Watanbe et al. ............ 711/105 |
| 2001/0051977 A1 | * | 12/2001 | Hagersten ................... 709/203 |

* cited by examiner

| Bit Time | 7 | 6 | 5 | 4 | 3 | 2 | 1 | 0 |
|---|---|---|---|---|---|---|---|---|
| 1 | | | CMD[5:0] | | | | | |
| 2 | | | | | | | | |
| 3 | | | | | | | | |
| 4 | | | | | | | | |

| Bit Time | 7 | 6 | 5 | 4 | 3 | 2 | 1 | 0 |
|---|---|---|---|---|---|---|---|---|
| 1 | SrcUnit[1:0] | | CMD[5:0] | | | | | |
| 2 | DestNode[2:0] | | | DestUnit[1:0] | | SrcNode[2:0] | | |
| 3 | | | | SrcTag[4:0] | | | | |
| 4 | | | | | | | | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

| Bit Time | 7 | 6 | 5 | 4 | 3 | 2 | 1 | 0 |
|---|---|---|---|---|---|---|---|---|
| 1 | SrcUnit[1:0] | | CMD[5:0] | | | | | |
| 2 | DestNode [2:0] | | | DestUnit[1:0] | | SrcNode[2:0] | | |
| 3 | | | | SrcTag[4:0] | | | | |
| 4 | Sh | | | | | | | |

Fig. 5

| Bit Time | 7 | 6 | 5 | 4 | 3 | 2 | 1 | 0 |
|---|---|---|---|---|---|---|---|---|
| 1 | Data[7:0] | | | | | | | |
| 2 | Data[15:8] | | | | | | | |
| 3 | Data[23:16] | | | | | | | |
| 4 | Data[31:24] | | | | | | | |
| 5 | Data[39:32] | | | | | | | |
| 6 | Data[47:40] | | | | | | | |
| 7 | Data[55:48] | | | | | | | |
| 8 | Data[63:56] | | | | | | | |

Fig. 6

| CMD Code | VChan | Command | Packet Type |
|---|---|---|---|
| 000000 | - | Nop | Info |
| 000001 | NPC | VicBlk | Command/Data |
| 000010 |  | Reserved |  |
| 000011 | NPC | ValidateBlk | Command |
| 000100 | NPC | RdBlk | Command |
| 000101 | NPC | RdBlkS | Command |
| 000110 | NPC | RdBlkMod | Command |
| 000111 | NPC | ChangetoDirty | Command |
| x01xxx | NPC or PC | WrSized | Command/Data |
| 01xxxx | NPC | ReadSized | Command |
| 100xxx |  | Reserved |  |
| 110000 | R | RdResponse | Response/Data |
| 110001 | R | ProbeResp | Response |
| 110010 | R | TgtStart | Response |
| 110011 | R | TgtDone | Response |
| 110100 | R | SrcDone | Response |
| 110101 | R | MemCancel | Response |
| 11011x |  | Reserved |  |
| 11100x | P | Probe | Command |
| 111010 | P | Broadcast | Command |
| 111011 |  | Reserved |  |
| 11110x |  | Reserved |  |
| 111110 |  | Reserved |  |
| 111111 | - | Sync | Info |

Virtual Channels

| Virtual Channel | Applicable Links |
|---|---|
| Posted Commands | Coherent and NonCoherent |
| Non-Posted Commands | Coherent and NonCoherent |
| Responses | Coherent and NonCoherent |
| Probes | Coherent Only |

| Bit Time | 7 | 6 | 5 | 4 | 3 | 2 | 1 | 0 |
|---|---|---|---|---|---|---|---|---|
| 1 | RSV | | CMD[5:0] | | | | | |
| 2 | RespData[1:0] | | Response[1:0] | | PostCmd Data[1:0] | | PostCmd [1:0] | |
| 3 | RSV | | Probe[1:0] | | NonPost Data[1:0] | | NonPost Cmd[1:0] | |
| 4 | RSV | | | | | | | |

| CMD Code | VChan | Command | Packet Type |
|---|---|---|---|
| 000000 | - | Nop | Info |
| 000001 | | Reserved | |
| 000010 | NPC | Flush | Command |
| 000011 | | Reserved | |
| 0001xx | | Reserved | |
| x01xxx | NPC or PC | WrSized | Command/Data |
| 01xxxx | NPC | ReadSized | Command |
| 100xxx | | Reserved | |
| 110000 | R | RdResponse | Response/Data |
| 110001 | | Reserved | |
| 110010 | | Reserved | |
| 110011 | R | TgtDone | Response |
| 11010x | | Reserved | |
| 110110 | | Reserved | |
| 110111 | R | AssignAck | Response |
| 11100x | | Reserved | |
| 111010 | PC | Broadcast | Command |
| 111011 | | Reserved | |
| 11110x | | Reserved | |
| 111110 | - | Assign | Info |
| 111111 | - | Sync | Info |

| Bit Time | 7 | 6 | 5 | 4 | 3 | 2 | 1 | 0 |
|---|---|---|---|---|---|---|---|---|
| 1 | SeqID[3:2] | | CMD[5:0] | | | | | |
| 2 | Pass PW | SeqID[1:0] | | UnitID[4:0] | | | | |
| 3 | | | | SrcTag[4:0] | | | | |
| 4 | | | | | | | | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

| Bit Time | 7 | 6 | 5 | 4 | 3 | 2 | 1 | 0 |
|---|---|---|---|---|---|---|---|---|
| 1 | | CMD[5:0] | | | | | | |
| 2 | Pass PW | | | UnitID[4:0] | | | | |
| 3 | | | | SrcTag[4:0] | | | | |
| 4 | | | | | | | | |

| First Command (CMD$_1$) | Second Command (CMD$_2$) | Wait Requirements |
|---|---|---|
| Memory Write | Memory Write | 1. CMD$_2$ waits for TgtStart$_1$<br>2. SrcDone$_2$ waits for TgtDone$_1$<br>3. TgtDone$_2$ on Noncoherent Link waits for TgtDone$_1$ on Coherent Link |
| Memory Write | Memory Read | 1. CMD$_2$ waits for TgtStart$_1$<br>2. RdResponse$_2$ on Noncoherent Link waits for TgtDone$_1$ on Coherent Link |
| Memory Read | Any Memory | CMD$_2$ waits for TgtStart$_1$ |
| Memory Write | I/O or Interrupt | CMD$_2$ waits for TgtDone$_1$ |
| Memory Read | Any I/O | CMD$_2$ waits for TgtStart$_1$ |
| Memory Write | Flush | TgtDone$_2$ on the Noncoherent Link waits for TgtDone$_1$ on the Coherent Link |
| Memory Write | Response | Response$_2$ waits for TgtDone$_1$ |
| Memory Read | Response | Response$_2$ waits for TgtStart$_1$ |
| Any I/O | Any Memory, any I/O, or Interrupt | CMD$_2$ waits for TgtStart$_1$ |
| Any I/O | Flush | TgtDone$_2$ on the Noncoherent Link waits for TgtStart$_1$ on the Coherent Link |
| Any I/O | Response | Response$_2$ waits for TgtStart$_1$ |
| Interrupt Broadcast, Low Priority | Interrupt Broadcast | CMD$_2$ waits for RdResponse$_1$ |
| SysMgt Write | Response | Response$_2$ waits for TgtDone$_1$ |

Fig. 28

RESPONSE VIRTUAL CHANNEL FOR HANDLING ALL RESPONSES

BACKGROUND OF THE INVENTION

1. Field of the Invention

This invention is related to the field of computer systems and, more particularly, to interconnect between nodes in computer systems.

2. Description of the Related Art

Generally, personal computers (PCs) and other types of computer systems have been designed around a shared bus system for accessing memory. One or more processors and one or more input/output (I/O) devices are coupled to memory through the shared bus. The I/O devices may be coupled to the shared bus through an I/O bridge which manages the transfer of information between the shared bus and the I/O devices, while processors are typically coupled directly to the shared bus or are coupled through a cache hierarchy to the shared bus.

Unfortunately, shared bus systems suffer from several drawbacks. For example, since there are multiple devices attached to the shared bus, the bus is typically operated at a relatively low frequency. The multiple attachments present a high capacitive load to a device driving a signal on the bus, and the multiple attach points present a relatively complicated transmission line model for high frequencies. Accordingly, the frequency remains low, and bandwidth available on the shared bus is similarly relatively low. The low bandwidth presents a barrier to attaching additional devices to the shared bus, as performance may be limited by available bandwidth.

Another disadvantage of the shared bus system is a lack of scalability to larger numbers of devices. As mentioned above, the amount of bandwidth is fixed (and may decrease if adding additional devices reduces the operable frequency of the bus). Once the bandwidth requirements of the devices attached to the bus (either directly or indirectly) exceeds the available bandwidth of the bus, devices will frequently be stalled when attempting access to the bus. Overall performance may be decreased.

One or more of the above problems may be addressed using a distributed memory system. A computer system employing a distributed memory system includes multiple nodes. Two or more of the nodes are connected to memory, and the nodes are interconnected using any suitable interconnect. For example, each node may be connected to each other node using dedicated lines. Alternatively, each node may connect to a fixed number of other nodes, and transactions may be routed from a first node to a second node to which the first node is not directly connected via one or more intermediate nodes. The memory address space is assigned across the memories in each node. Generally, a "node" is a device which is capable of participating in transactions upon the interconnect. For example, in a packet-based interconnect the node may be configured to receive and transmit packets to other nodes. One or more packets may be employed to perform a particular transaction. A particular node may be a destination for a packet, in which case the information is accepted by the node and processed internal to the node. Alternatively, the particular node may be used to relay a packet from a source node to a destination node if the particular node is not the destination node of the packet.

Distributed memory systems present design challenges which differ from the challenges in shared bus systems. For example, shared bus systems regulate the initiation of transactions through bus arbitration. Accordingly, a fair arbitration algorithm allows each bus participant the opportunity to initiate transactions. The order of transactions on the bus may represent the order that transactions are performed (e.g. for coherency purposes). On the other hand, in distributed systems, nodes may initiate transactions concurrently and use the interconnect to transmit the transactions to other nodes. These transactions may have logical conflicts between them (e.g. coherency conflicts for transactions to the same address) and may experience resource conflicts (e.g. buffer space may not be available in various nodes) since no central mechanism for regulating the initiation of transactions is provided. Accordingly, it is more difficult to ensure that information continues to propagate among the nodes smoothly and that deadlock situations (in which no transactions are completed due to conflicts between the transactions) are avoided. A method and apparatus for avoiding deadlock in a distributed system is desired. Additionally, it is desired to minimize the apparatus (in terms of hardware) to enhance ease of implementation.

SUMMARY OF THE INVENTION

The problems outlined above are in large part solved by a computer system employing virtual channels and allocating different resources to the virtual channels as described herein. Packets which do not have logical/protocol-related conflicts are grouped into a virtual channel. Accordingly, logical conflicts occur between packets in separate virtual channels. The packets within a virtual channel may share resources (and hence experience resource conflicts), but the packets within different virtual channels may not share resources. Since packets which may experience resource conflicts do not experience logical conflicts, and since packets which may experience logical conflicts do not experience resource conflicts, deadlock-free operation may be achieved.

Additionally, nodes within the computer system may be configured to preallocate resources to process response packets. Some response packets may have logical conflicts with other response packets, and hence would normally not be allocable to the same virtual channel. However, by preallocating response-processing resources, response packets are accepted by the destination node. Thus, any resource conflicts which may occur are temporary (as the response packets which make forward progress are processable). Viewed in another way, response packets may be logically independent if the destination node is capable of processing the response packets upon receipt. Accordingly, a response virtual channel is formed to which each response packet belongs. Since fewer virtual channels are used, fewer resources are used to support the virtual channels, and hence the amount of hardware used to support the virtual channels is decreased.

Broadly speaking, a method for routing packets among a plurality of nodes in a computer system is contemplated. A first response packet is received in a first node of the plurality of nodes. The first node comprises a plurality of control packet buffers, each of which is assigned to a different one of a plurality of virtual channels. The first response packet is stored in a response buffer which is one of the plurality of control packet buffers. The plurality of control packet buffers further includes at least two additional control packet buffers corresponding to at least two additional virtual channels of the plurality of virtual channels. The first response packet is a response to a first control packet belonging to one of the at least two additional virtual channels. The storing of the first response packet in the response buffer is independent of which one of the at least two additional virtual channels the first control packet belongs to.

Additionally, a computer system is contemplated, comprising a first node and a second node. The first node is configured to transmit a first response packet. Coupled to receive the first response packet from the first node, the second node comprises a response buffer assigned to a response virtual channel, a first control packet buffer assigned to a first virtual channel different from the response virtual channel, and a second control packet buffer assigned to a second virtual channel different from the response virtual channel and the first virtual channel. The response packet is a response to a first control packet belonging to one of the first virtual channel and the second virtual channel, and the second node is configured to store the first response packet in the response buffer independent of which of the first virtual channel and the second virtual channel to which the first control packet belongs.

BRIEF DESCRIPTION OF THE DRAWINGS

Other objects and advantages of the invention will become apparent upon reading the following detailed description and upon reference to the accompanying drawings in which:

FIG. 3 is a block diagram illustrating one embodiment of an info packet.

FIG. 4 is a block diagram illustrating one embodiment of a command packet for the coherent link.

FIG. 5 is a block diagram illustrating one embodiment of a response packet for the coherent link.

FIG. 6 is a block diagram illustrating one embodiment of a data packet.

FIG. 7 is a table illustrating one embodiment of packet definitions for the coherent link.

FIG. 20 is a table illustrating one embodiment of packet definitions for the noncoherent link.

FIG. 28 is a table illustrating operation of one embodiment of the host bridge shown in FIG. 19.

Figure 1:
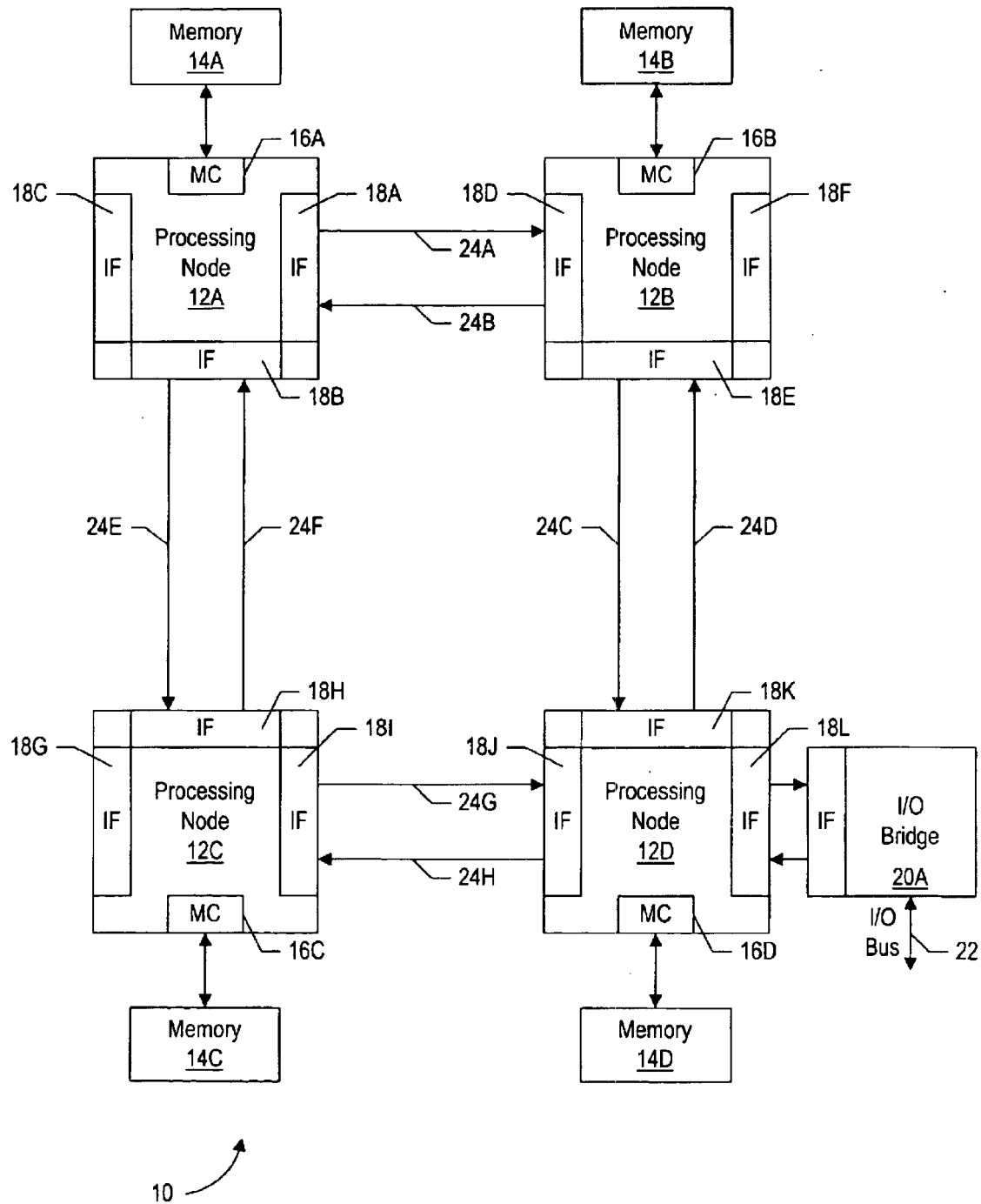
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE
PREFERRED EMBODIMENTS

System Overview

Turning now to FIG. 1, one embodiment of a computer system 10 is shown. Other embodiments are possible and contemplated. In the embodiment of FIG. 1, computer system 10 includes several processing nodes 12A, 12B, 12C, and 12D. Each processing node is coupled to a respective memory 14A–14D via a memory controller 16A–16D included within each respective processing node 12A–12D. Additionally, processing nodes 12A–12D include interface logic used to communicate between the processing nodes 12A–12D. For example, processing node 12A includes interface logic 18A for communicating with processing node 12B, interface logic 18B for communicating with processing node 12C, and a third interface logic 18C for communicating with yet another processing node (not shown). Similarly, processing node 12B includes interface logic 18D, 18E, and 18F; processing node 12C includes interface logic 18G, 18H, and 18I; and processing node 12D includes interface logic 18J, 18K, and 18L. Processing node 12D is coupled to communicate with an I/O bridge 20 via interface logic 18L. Other processing nodes may communicate with other I/O bridges in a similar fashion. I/O bridge 20 is coupled to an I/O bus 22.

Processing nodes 12A–12D implement a packet-based link for inter-processing node communication. In the present embodiment, the link is implemented as sets of unidirectional lines (e.g. lines 24A are used to transmit packets from processing node 12A to processing node 12B and lines 24B are used to transmit packets from processing node 12B to processing node 12A). Other sets of lines 24C–24H are used to transmit packets between other processing nodes as illustrated in FIG. 1. The link may be operated in a cache coherent fashion for communication between processing nodes ("the coherent link") or in a noncoherent fashion for communication between a processing node and an I/O bridge (the "noncoherent link"). Furthermore, the noncoherent link may be used as a daisy-chain structure between I/O devices to replace I/O bus 22. The interconnection of two or more nodes via coherent links may be referred to as a "coherent fabric". Similarly, the interconnection of two or more nodes via noncoherent links may be referred to as a "noncoherent fabric". It is noted that a packet to be transmitted from one processing node to another may pass through one or more intermediate nodes. For example, a packet transmitted by processing node 12A to processing node 12D may pass through either processing node 12B or processing node 12C as shown in FIG. 1. Any suitable routing algorithm may be used. Other embodiments of computer system 10 may include more or fewer processing nodes then the embodiment shown in FIG. 1.

Processing nodes 12A–12D, in addition to a memory controller and interface logic, may include one or more processors. Broadly speaking, a processing node comprises at least one processor and may optionally include a memory controller for communicating with a memory and other logic as desired.

Memories 14A–14D may comprise any suitable memory devices. For example, a memory 14A–14D may comprise one or more RAMBUS DRAMs (RDRAMs), synchronous DRAMs (SDRAMs), static RAM, etc. The address space of computer system 10 is divided among memories 14A–14D. Each processing node 12A–12D may include a memory map used to determine which addresses are mapped to which memories 14A–14D, and hence to which processing node 12A–12D a memory request for a particular address should be routed. In one embodiment, the coherency point for an address within computer system 10 is the memory controller 16A–16D coupled to the memory storing bytes corresponding to the address. In other words, the memory controller 16A–16D is responsible for ensuring that each memory access to the corresponding memory 14A–14D occurs in a cache coherent fashion. Memory controllers 16A–16D may comprise control circuitry for interfacing to memories 14A–14D. Additionally, memory controllers 16A–16D may include request queues for queuing memory requests.

Generally, interface logic 18A–18L may comprise buffers for receiving packets from the link and for buffering packets to be transmitted upon the link. Computer system 10 may employ any suitable flow control mechanism for transmitting packets. For example, in one embodiment, each node stores a count of the number of each type of buffer within the receiver at the other end of the link to which each interface logic is connected. The node does not transmit a packet unless the receiving node has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

Figure 2:
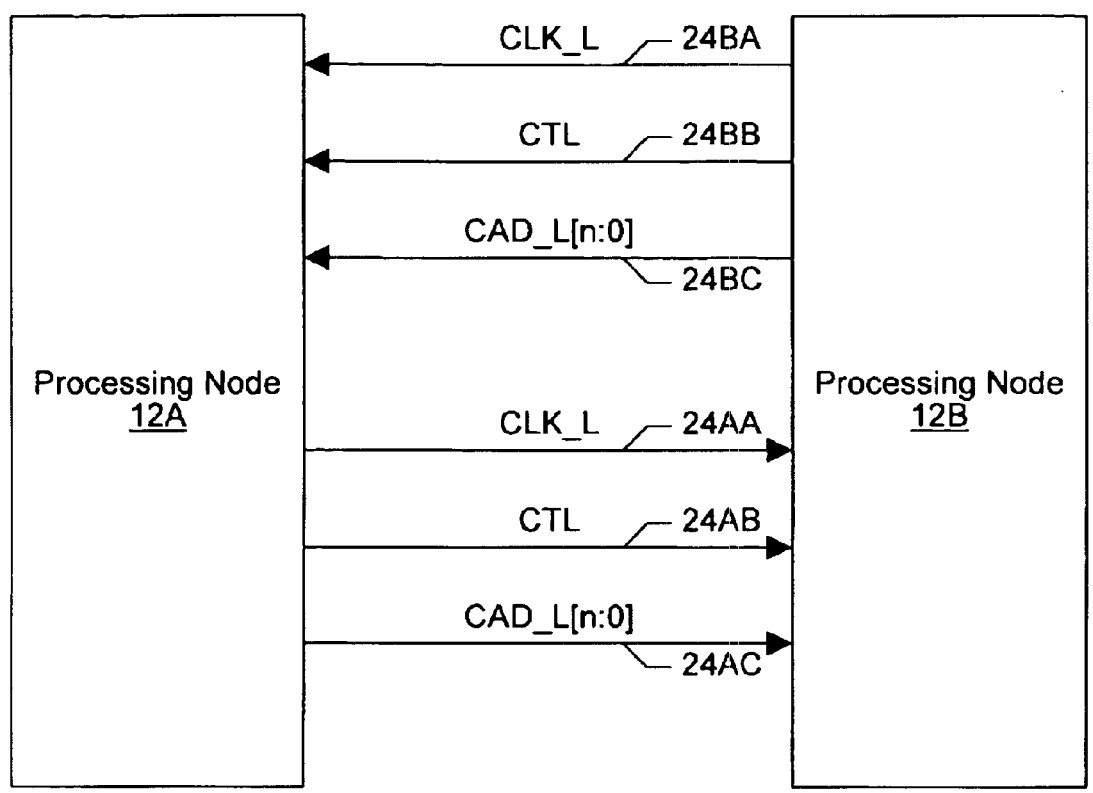
FIG. 2 is a block diagram of one embodiment of two nodes shown in FIG. 1, highlighting one embodiment of the link therebetween.

Turning next to FIG. 2, a block diagram illustrating processing nodes 12A and 12B is shown to illustrate one embodiment of the, links therebetween in more detail. Other embodiments are possible and contemplated. In the embodiment of FIG. 2, lines 24A include a clock line 24AA, a control line 24AB, and a control/address/data bus 24AC. Similarly, lines 24B include a clock line 24BA, a control line 24BB, and a control/address/data bus 24BC.

The clock line transmits a clock signal which indicates a sample point for the control line and the control/address/data bus. In one particular embodiment, data/control bits are transmitted on each edge (i.e. rising edge and falling edge) of the clock signal. Accordingly, two data bits per line may be transmitted per clock cycle. The amount of time employed to transmit one bit per line is referred to herein as a "bit time". The above-mentioned embodiment includes two bit times per clock cycle. A packet may be transmitted across two or more bit times. Multiple clock lines may be used depending upon the width of the control/address/data bus. For example, two clock lines may be used for a 32 bit control/address/data bus (with one half of the control/address/data bus referenced to one of the clock lines and the other half of the control/address/data bus and the control line referenced to the other one of the clock lines.

The control line indicates whether or not the data transmitted upon the control/address/data bus is either a bit time of a control packet or a bit time of a data packet. The control line is asserted to indicate a bit time of a control packet, and deasserted to indicate a bit time of a data packet. Certain control packets indicate that a data packet follows. The data packet may immediately follow the corresponding control packet. In one embodiment, other control packets may interrupt the transmission of a data packet. Such an interruption may be performed by asserting the control line for a number of bit times during transmission of the data packet and transmitting the bit times of the control packet while the control line is asserted. Control packets which interrupt a data packet may not indicate that a data packet will be following. Additionally, in one embodiment, the control line may be deasserted during transmission of a control packet to indicate stall bit times. A subsequent reassertion of the control line may indicate that the control packet is continuing.

The control/address/data bus comprises a set of lines for transmitting the data/control bits. In one embodiment, the control/address/data bus may comprise 8, 16, or 32 lines. Each processing node or I/O bridge may employ any one of the supported numbers of lines according to design choice. Other embodiments may support other sizes of control/address/data bus as desired.

According to one embodiment, the command/address/data bus lines and the clock line may carry inverted data (i.e. a logical one is represented as a low voltage on the line, and a logical zero is represented as a high voltage). Alternatively, lines may carry non-inverted data (in which a logical one is represented as a high voltage on the line, and logical zero is represented as a low voltage).

Turning now to FIGS. 3–6, exemplary packets employed on one embodiment of the coherent link are shown. FIGS. 3–5 illustrate control packets and FIG. 6 illustrates a data packet. Other embodiments may employ different packet definitions, as desired. Each of the packets are illustrated as a series of bit times enumerated under the "bit time" heading. The bit times of the packet are transmitted according to the bit time order listed. FIGS. 3–6 illustrate packets for an eight bit control/address/data bus implementation. Accordingly, each bit time comprises eight bits numbered seven through zero. Bits for which no value is provided in the figures may either be reserved for a given packet, or may be used to transmit packet-specific information. Fields indicated by dotted lines indicate optional fields which may not be included in all of the packets of a certain type.

Generally speaking, a packet is a communication between two nodes (an initiating node which transmits the packet and a destination node which receives the packet). The initiating node and the destination node may differ from the source and target node of the transaction of which the packet is a part, or either node may be either the source node or the target node. A control packet is a packet carrying control information regarding the transaction. Certain control packets specify that a data packet follows. The data packet carries data corresponding to the transaction and corresponding to the specifying control packet.

FIG. 3 illustrates an information packet (info packet) 30. Info packet 30 comprises four bit times on an eight bit link. The command encoding is transmitted during bit time one, and comprises six bits in the present embodiment. Each of the other control packets shown in FIGS. 4 and 5 include the command encoding in the same bit positions during bit time 1. Info packet 30 may be used to transmit messages between processing nodes when the messages do not include a memory address. Additionally, info packets may be used to transmit buffer free counts using the coupon-based flow control scheme.

FIG. 4 illustrates a command packet 32. Command packet 32 comprises eight bit times on an eight bit link. The command encoding is transmitted during bit time 1. A source unit number is transmitted during bit time 1 as well, and a source node number is transmitted during bit time two. A node number unambiguously identifies one of the processing nodes 12A–12D within computer system 10, and is used to route the packet through computer system 10. The unit number identifies a unit within the node which sourced the transaction (source unit number) or which is the destination of the transaction (destination unit number). Units may include memory controllers, caches, processors, etc. Optionally, command packet 32 may include either a destination node number and destination unit in bit time 2 (or a target node number and target unit, for some other packets). If the destination node number is included, it is used to route the packet to the destination node. Also, many command packets may include a source tag in bit time 3 which, together with the source node and source unit, may link the packet to a particular transaction of which it is a part. Bit times five through eight are used transmit the most significant bits of the memory address affected by the transaction. Command packet 32 may be used to initiate a transaction (e.g. a read or write transaction), as well as to transmit commands in the process of carrying out the transaction for those commands which carry the memory address affected by the transaction. Generally, a command packet indicates an operation to be performed by the destination node.

Some of the undefined fields in packet 32 may be used in various command packets to carry packet-specific information. Furthermore, bit time 4 may be used in some commands to transmit the least significant bits of the memory address affected by the transaction.

FIG. 5 illustrates a response packet 34. Response packet 34 includes the command encoding and a destination node number and destination unit number. The destination node number identifies the destination node for the response packet (which may, in some cases, be the source node or target node of the transaction). The destination unit number identifies the destination unit within the destination node. Various types of response packets may include additional information. For example, a read response packet may indicate the amount of read data provided in a following data packet. Probe responses may indicate whether or not a copy of the requested cache block is being retained by the probed node (using the optional shared bit "Sh" in bit tize 4). Generally, response packet 34 is used for commands during the carrying out of a transaction which do not require transmission of the memory address affected by the transaction. Furthermore, response packet 34 may be used to transmit positive acknowledgement packets to terminate a transaction. Similar to the command packet 32, response packet 34 may include the source node number, the source unit number, and the source tag for many types of responses (illustrated as optional fields in FIG. 5).

FIG. 6 illustrates the data packet 36. Data packet 36 includes eight bit times on an eight bit link in the embodiment of FIG. 6. Data packet 36 may comprise different numbers of bit times dependent upon the amount of data being transferred. For example, in one embodiment a cache block comprises 64 bytes and hence 64 bit times on an eight bit link. Other embodiments may define a cache block to be of a different size, as desired. Additionally, data may be transmitted in less than cache block sizes for non-cacheable reads and writes. Data packets for transmitting data less than cache block size employ fewer bit times. In one embodiment, non-cache block sized data packets ray transmit several bit times of byte enables prior to transmitting the data to indicate which data bytes are valid within the data packet. Furthermore, cache block data may be returned with the quadword addressed by the least significant bit of the request address first, followed by interleaved return of the remaining quadwords. A quadword may comprise 8 bytes, in one embodiment.

FIGS. 3–6 illustrate packets for an eight bit link. Packets for 16 and 32 bit links may be formed by concatenating consecutive bit times illustrated in FIGS. 3–6. For example, bit time one of a packet on a 16 bit link may comprise the information transmitted during bit times one and two on the eight bit link. Similarly, bit time one of the packet on a 32 bit link may comprise the information transmitted during bit times one through four on the eight bit link. Formulas 1 and 2 below illustrate the formation of bit time one of a 16 bit link and bit time one of a 32 bit link according to bit times from an eight bit link.

$$BT1_{16}[15:0]=BT2_8[7:0]\|BT1_8[7:0] \tag{1}$$

$$BT1_{32}[31:0]=BT4_8[7:0]\|BT3_8[7:0]\|BT1_8[7:0] \tag{2}$$

Turning now to FIG. 7, a table 38 is shown illustrating packets employed according to one exemplary embodiment of the coherent link within computer system 10. Other embodiments are possible and contemplated, including any other suitable set of packets and command field encodings. Table 38 includes a command code column illustrating the command encodings assigned to each command, a command column naming the command, and a packet type column indicating which of command packets 30–34 (and data packet 36, where specified) is employed for that command.

A read transaction is initiated using one of the ReadSized, RdBlk, RdBlkS or RdBlkMod commands. The ReadSized command is used for non-cacheable reads or reads of data other than a cache block in size. The amount of data to be read is encoded into the ReadSized command packet. For reads of a cache block, the RdBlk command may be used unless: (i) a writeable copy of the cache block is desired, in which case the RdBlkMod command may be used; or (ii) a copy of the cache block is desired but no intention to modify the block is known, in which case the RdBlkS command may be used. The RdBlkS command may be used to make certain types of coherency schemes (e.g. directory-based coherency schemes) more efficient. In general, the appropriate read command is transmitted from the source initiating the transaction to a target node which owns the memory corresponding to the cache block. The memory controller in the target node transmits Probe commands (indicating return of probe responses to the source of the transactions) to the other nodes in the system to maintain coherency by changing the state of the cache block in those nodes and by causing a node including an updated copy of the cache block to send the cache block to the source node. Each node receiving a Probe command transmits a ProbeResp response packet to the source node. If a probed node has an updated copy of the read data (i.e. dirty data), that node transmits a RdResponse response packet and the dirty data. A node transmitting dirty data may also transmit a MemCancel response packet to the target node in an attempt to cancel transmission by the target node of the requested read data. Additionally, the memory controller in the target node transmits the requested read data using a RdResponse response packet followed by the data in a data packet. If the source node receives a RdResponse response packet from a probed node, that read data is used. Otherwise, the data from the target node is used. Once each of the probe responses and the read data is received in the source node, the source node transmits a SrcDone response packet to the target node as a positive acknowledgement of the termination of the transaction.

A write transaction is initiated using a WrSized or VicBlk command followed by a corresponding data packet. The WrSized command is used for non-cacheable writes or writes of data other than a cache block in size. To maintain coherency for WrSized commands, the memory controller in the target node transmits Probe commands (indicating return of probe response to the target node of the transaction) to each of the other nodes in the system. In response to Probe commands, each probed node transmits a ProbeResp response packet to the target node. If a probed node is storing dirty data, the probed node responds with a RdResponse response packet and the dirty data. In this manner, a cache block updated by the WrSized command is returned to the memory controller for merging with the data provided by the WrSized command. The memory controller, upon receiving probe responses from each of the probed nodes, transmits a TgtDone response packet to the source node to provide a positive acknowledgement of the termination of the transaction. The source node replies with a SrcDone response packet.

A victim cache block which has been modified by a node and is being replaced in a cache within the node is transmitted back to memory using the VicBlk command. Probes are not needed for the VicBlk command. Accordingly, when the target memory controller is prepared to commit victim block data to memory, the target memory controller transmits a TgtDone response packet to the source node of the victim block. The source node replies with either a SrcDone response packet to indicate that the data should be committed or a MemCancel response packet to indicate that the data has been invalidated between transmission of the VicBlk command and receipt of the TgtDone response packet (e.g. in response to an intervening probe).

The ChangetoDirty command packet may be transmitted by a source node in order to obtain write permission for a cache block stored by the source node in a nonwriteable state. A transaction initiated with a ChangetoDirty command may operate similar to a read except that the target node does not return data. The ValidateBlk command may be used to obtain write permission to a cache block not stored by a source node if the source node intends to update the entire cache block. No data is transferred to the source node for such a transaction, but otherwise operates similar to a read transaction.

The TgtStart response may be used by a target to indicate that a transaction has been started (e.g. for ordering of subsequent transactions). The Nop info packet is a no-operation packet which may be used, e.g. to transfer buffer free indications between nodes. The Broadcast command may be used to broadcast messages between nodes (e.g., the broadcast command may be used to distribute interrupts). Finally, the sync info packet may be used for cases in which synchronization of the fabric is desired (e.g. error detection, reset, initialization, etc.).

Table 38 also includes a virtual channel column (Vchan). The virtual channel column indicates the virtual channel in which each packet travels (i.e. to which each packet belongs). In the present embodiment, four virtual channels are defined: non-posted commands (NPC), posted commands (PC), responses (R), and probes (P). A Write(Sized) command may belong to the non-posted command virtual channel or the posted command virtual channel. In one embodiment, bit 5 of the command field is used to distinguish posted writes and non-posted writes. Other embodiments may use a different field to specify posted vs. non-posted writes. Virtual channels will now be described in more detail. It is noted that info packets are used to communicate between adjacent nodes, and hence may not be assigned to virtual channels in the present embodiment.

Virtual Channels

Figure 8:
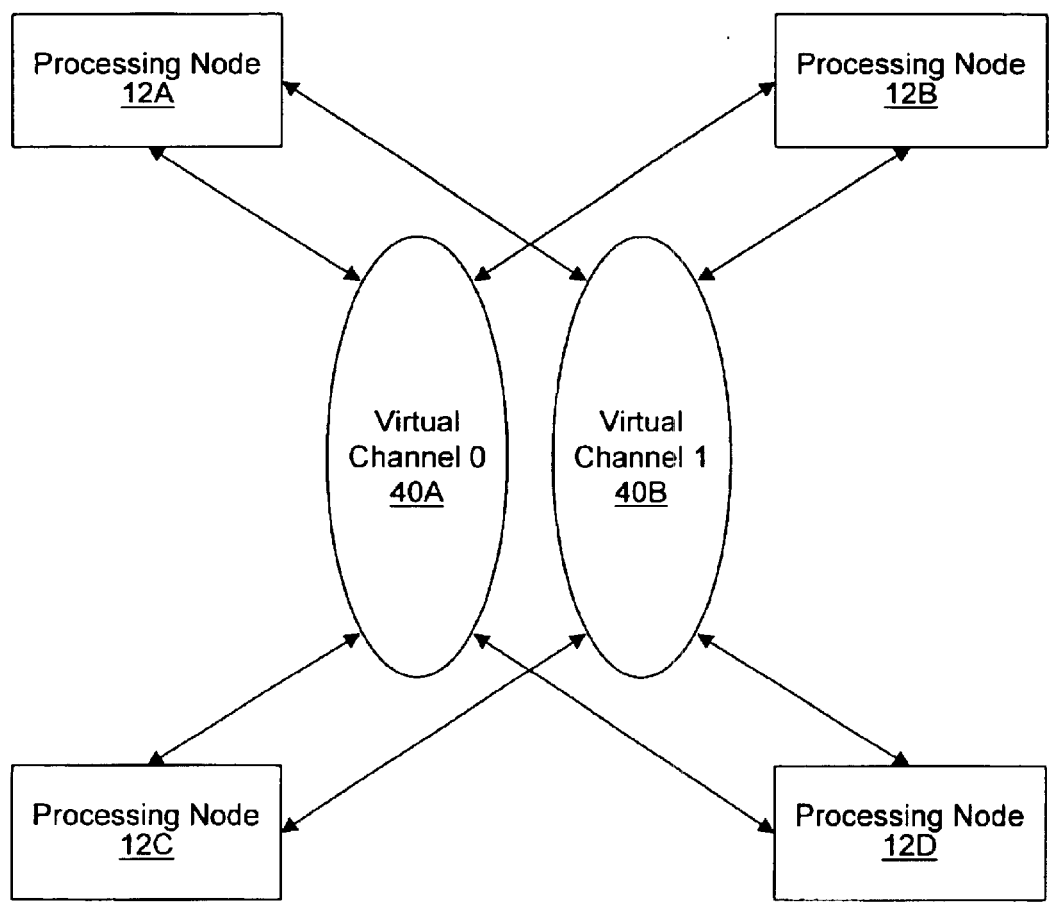
FIG. 8 is a block diagram illustrating a pair of virtual channels.
Figure 9:
FIG. 9 is a table illustrating one embodiment of a set of virtual channels.

Turning next to FIG. 8, a block diagram is shown to illustrate virtual channels. In 2 FIG. 8, two virtual channels are shown (virtual channels 40A and 40B). Each of processing nodes 12A–12D is coupled to virtual channels 40A–40B. Two virtual channels are shown in FIG. 8 for illustrative purposes only. Other embodiments may employ any suitable number of virtual channels. For example, an embodiment of computer system 10 may employ four virtual channels as illustrated in FIG. 9 below.

Generally speaking, a "virtual channel" is a communication path for carrying packets between various processing nodes. Each virtual channel is resource-independent of the other virtual channels (i.e. packets flowing in one virtual channel are generally not affected, in terms of physical transmission, by the presence or absence of packets in another virtual channel). Packets are assigned to a virtual channel based upon packet type. Packets in the same virtual channel may physically conflict with each other's transmission (i.e. packets in the same virtual channel may experience resource conflicts), but may not physically conflict with the transmission of packets in a different virtual channel.

Certain packets may logically conflict with other packets (i.e. for protocol reasons, coherency reasons, or other such reasons, one packet may logically conflict with another packet). If a first packet, for logical/protocol reasons, must arrive at its destination node before a second packet arrives at its destination node, it is possible that a computer system could deadlock if the second packet physically blocks the first packet's transmission (by occupying conflicting resources). By assigning the first and second packets to separate virtual channels, and by implementing the transmission medium within the computer system such that packets in separate virtual channels cannot block each other's transmission, deadlock-free operation may be achieved. It is noted that the packets from different virtual channels are transmitted over the same physical links (e.g. lines 24 in FIG. 1). However, since a receiving buffer is available prior to transmission, the virtual channels do not block each other even while using this shared resource.

From one viewpoint, each different packet type (e.g. each different command encoding) could be assigned to its own virtual channel. However, the hardware to ensure that virtual channels are physically conflict-free may increase with the number of virtual channels. For example, in one embodiment, separate buffers are allocated to each virtual channel. Since separate buffers are used for each virtual channel, packets from one virtual channel do not physically conflict with packets from another virtual channel (since such packets would be placed in the other buffers). However, the number of buffers is proportional to the number of virtual channels. Accordingly, it is desirable to reduce the number of virtual channels by combining various packet types which do not conflict in a logical/protocol fashion. While such packets may physically conflict with each other when travelling in the same virtual channel, their lack of logical conflict allows for the resource conflict to be resolved without deadlock. Similarly, keeping packets which may logically conflict with each other in separate virtual channels provides for no resource conflict between the packets. Accordingly, the logical conflict may be resolved through the lack of resource conflict between the packets by allowing the packet which is to be completed first to make progress.

In one embodiment, packets travelling within a particular virtual channel on the coherent link from a particular source node to a particular destination node remain in order. However, packets from the particular source node to the particular destination node which travel in different virtual channels are not ordered. Similarly, packets from the particular source node to different destination nodes, or from different source nodes to the same destination node, are not ordered (even if travelling in the same virtual channel).

Figure 19:
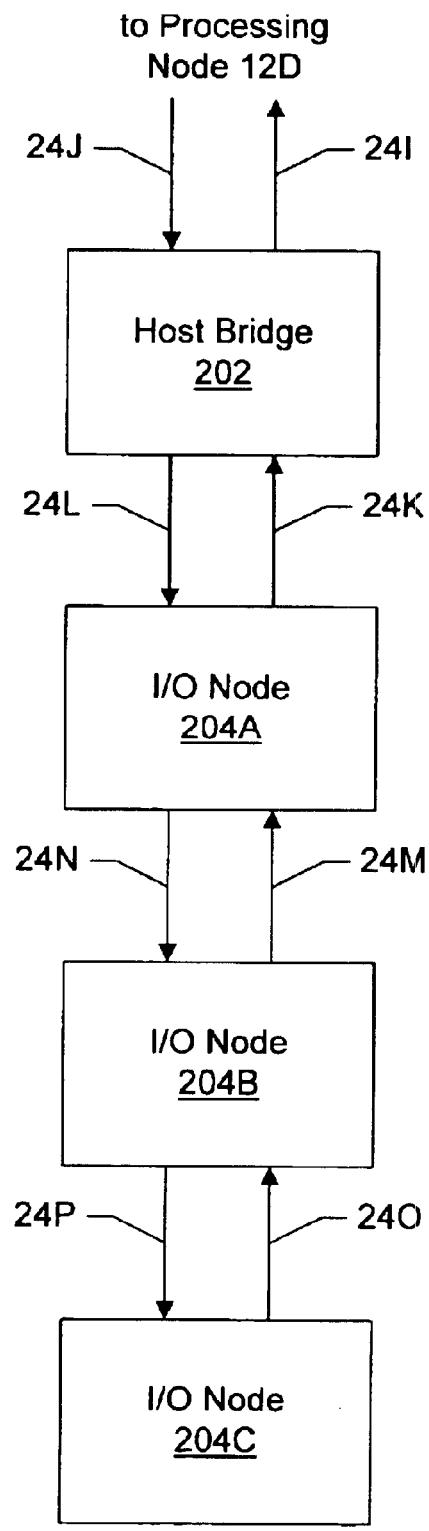
FIG. 19 is a block diagram of one embodiment of an I/O subsystem including a host bridge and a plurality of I/O nodes interconnected via links similar to the interconnection shown in FIGS. 1 and 2.

The virtual channels are physically mapped onto the coherent fabric and onto the noncoherent fabric (see FIG. 19). For example, in the embodiment of computer system 10 shown in FIG. 1, the interconnect includes unidirectional links between each node. Accordingly, packets travelling in the various virtual channels are physically transmitted on the unidirectional links. Packets may travel through intermediate nodes between the source and the destination. For example, packets travelling from node 12A to node 12D may pass through node 12B and 12C. Packets travelling in different virtual channels may be routed through computer system 10 differently. For example, packets travelling in a first virtual channel from node 12A to node 12D may pass through node 12B, while packets travelling in a second virtual channel from node 12A to node 12D may pass through node 12C. Each node includes circuitry to ensure that packets in different virtual channels do not physically conflict with each other. In the noncoherent fabric, packets from an I/O node may pass through each other I/O node between that I/O node and the host bridge (see FIG. 19). It is noted that the I/O nodes may be coupled to the virtual channels in a similar fashion to that shown in FIG. 8.

In one particular embodiment described in more detail below, control packet buffers are assigned to each virtual channel to buffer control packets travelling in that virtual channel. Separate data packet buffers may also be assigned to each virtual channel which may carry data packets. By separating control packet buffers (each entry of which may comprise a relatively small number of bit times) and data packet buffers (each entry of which may comprise a relatively large number of bit times to hold a cache block), buffer space may be saved while still providing suitable data storage. More control packet buffers may be implemented than data packet buffers (since all data packets have a corresponding control packet but not all control packets have a corresponding data packet). Throughput may be high while making relatively efficient use of the buffer space.

FIG. 9 is a table 42 illustrating the virtual channels defined according to one embodiment of computer system 10. Other embodiments are possible and contemplated. For the embodiment shown, four virtual channels are defined. The packets which belong to those virtual channels for the coherent link are shown in FIG. 7, and the packets which belong to those virtual channels for the noncoherent link are shown in FIG. 20.

The posted command virtual channel is used for posted command packets (and corresponding data packets). Generally speaking, a posted command is a command which is completed on a source interface (to which the source of the command is connected) prior to the command being completed on the target interface (to which the target of the command is connected). For example, in the embodiment of FIG. 1, a posted command may be sourced on the noncoherent fabric (or I/O bus 22) and targeted to the coherent fabric, or vice-versa. Furthermore, if multiple daisy-chains of noncoherent fabric are implemented, a posted command may be completed on one noncoherent fabric prior to reaching a target noncoherent fabric. Since the posted command is completed at the source, the source may continue with other operations while the posted command travels to its target. The source is not directly aware of the time at which the posted command actually completes in the destination. In one embodiment, posted commands include posted writes (in which the command and corresponding data are transmitted and then the command is complete with respect to the source interface).

In the present embodiment, a posted command is completed on the coherent link by transmitting the TgtDone response to the source node prior to completing the posted command on the target interface (e.g. the noncoherent link). In one embodiment of the noncoherent link, there is no TgtDone response for posted commands. The posted command is completed upon successful transmission out of the source node.

The non-posted command virtual channel is used for non-posted command packets (and corresponding data packets). A non-posted command, in contrast to a posted command, is a command which is not completed on the source interface prior to completing on the target interface. In this manner, the source of the command is directly aware (via completion of the command) that the command has completed at the target. Generally, non-posted commands initiate transactions, and hence a non-posted command does not cause the transmission of additional non-posted command packets. Furthermore, the various non-posted command packets do not have a logical/protocol conflict with each other since there is no order between them until they reach the destination (the target of the transaction). Accordingly, non-posted command packets may be included in one virtual channel.

Posted and non-posted command packets belong to separate virtual channels to provide compatibility with certain input/output (or peripheral) bus protocols. For example, the Peripheral Component Interconnect (PCI) bus interface provides for posted writes. The following ordering rules are required by PCI for operations sourced on PCI:

(i) posted writes from the same source remain in order on the target interface;

(ii) posted writes followed by a read from the same source are completed on the target interface before the read data is returned;

(iii) non-posted writes remain ordered with posted writes from the same source; and (iv) non-posted operations followed by posted writes must be allowed to become unordered.

Requirement (iv) is provided to ensure the lack of a deadlock in legacy PCI bridges (see the PCI Local Bus Specification, revision 2.1, appendix E for more details). Requirement (i) is accomplished by placing posted commands in the posted command virtual channel (and thus they remain ordered to a particular target) along with certain constraints implemented by the host bridge (see FIG. 28). Requirements (ii) and (iii) are logical conflicts between the posted commands channel and the non-posted commands channel on the noncoherent fabric, and hence may be handled by the nodes and does not create a deadlock since the logical conflict is between packets in different virtual channels. Additional details regarding the logical conflict on the noncoherent link will be provided below. Requirements (ii) and (iii) may be satisfied when posted writes are transmitted from the non-coherent link to the coherent link by implementing certain constraints at the host bridge (see FIG. 28). Requirement (iv) is satisfied by providing separate posted and non-posted virtual channels.

Posted and non-posted commands may cause the generation of probe command packets (to maintain coherency in the coherent fabric) and response packets (to transfer data and provide positive acknowledgement of transactions). Accordingly, probe packets and response packets are not included in the same virtual channel as the posted and non-posted commands (to prevent resource conflicts and logical conflicts from creating a deadlock). Furthermore, probe packets may cause the generation of probe response and read response packets, and thus are placed in a separate virtual channel from response packets.

Response packets may also generate additional response packets (for example, SrcDone and TgtDone may cause each other to be generated). Therefore, it is possible that response packets could create logical conflicts with other response packets by placing them in the same virtual channel. However, providing multiple response virtual channels may be undesirable due to the increased resource requirements (e.g. buffers) to handle the additional virtual channels. Response packets are the result, either directly or indirectly (e.g. via a probe generated in response to a command packet), of a command packet (either posted or non-posted). Nodes 12A–12D (and I/O nodes shown below) are configured to allocate, prior to initiating a transaction with a posted or non-posted command packet, to allocate sufficient resources for processing the response packets (including any response data packets) which may be generated during that transaction. Similarly, prior to generating a probe command packet, a node is configured to allocate sufficient resources for processing the probe response packets (if the response packets will be returned to that node). In this manner, all response packets are accepted by the destination node. Accordingly, the response packets may be merged into one response virtual channel. Response packets (and corresponding data packets) travel in the response virtual channel.

Finally, probe command packets travel in the probe virtual channel. Probes are used to maintain coherency between various cached copies of a memory location and the memory location itself. Coherency activities corresponding to a first command packet being processed by a memory controller may need to be completed before subsequent command packets may be processed. For example, if the memory controller's queue were full of commands to the same cache block, no additional processing of command packets would occur at the memory controller until completion of the first command. Accordingly, the probe command packets (and responses) are provided separate virtual channels to ensure that resource conflicts with packets in other virtual channels do not block the probe command packets.

Table 42 also indicates which form of the links in computer system 10 (coherent links between coherent nodes and non-coherent links between non-coherent nodes) to which the virtual channels are applicable. Non-coherent and coherent links both support the posted command, non-posted command, and response virtual channels. Non-coherent links do not support coherency (which probe command packets are used to ensure), and therefore may not support the probe virtual channel.

Virtual Channels—Coherent Fabric

Figure 10:
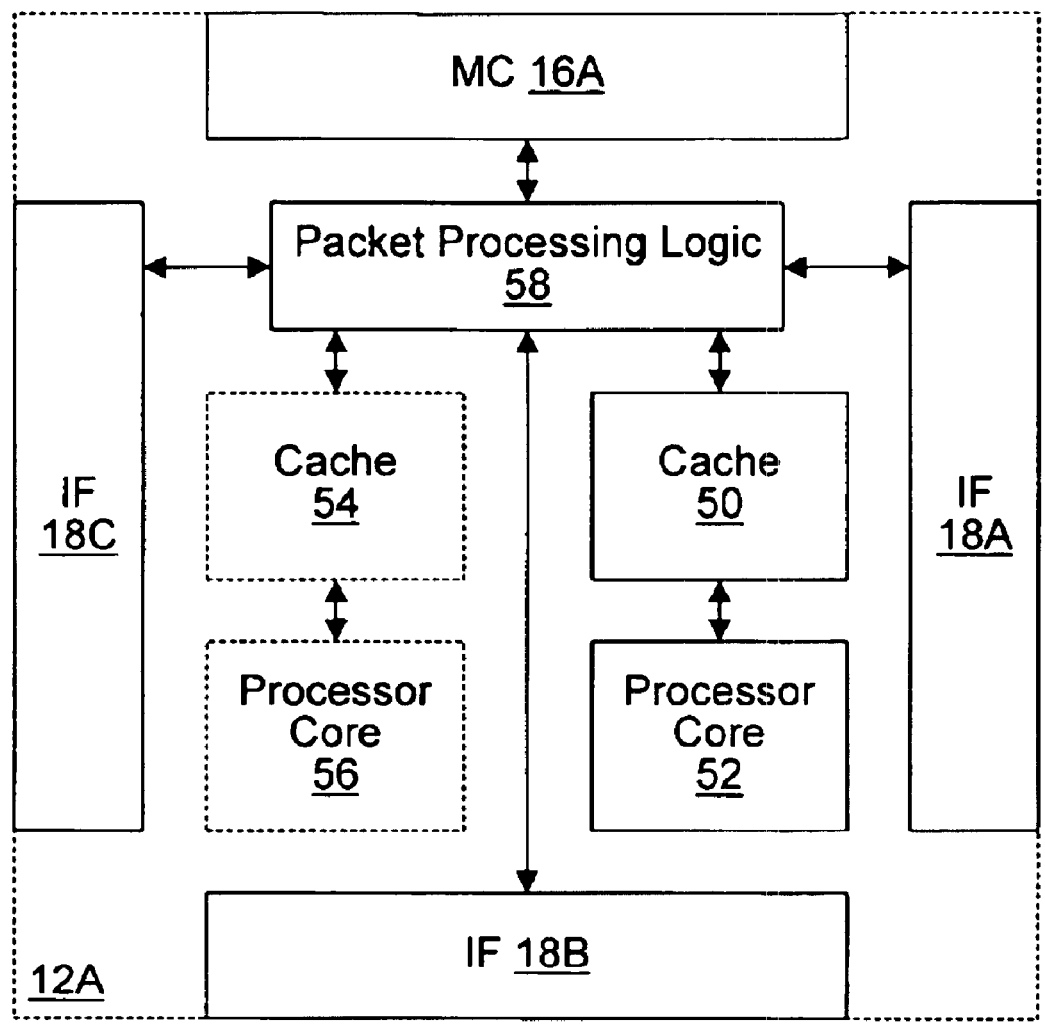
FIG. 10 is a block diagram of one embodiment of a processing node shown in FIG.

Turning now to FIG. 10, a block diagram of one embodiment of an exemplary processing node 12A is shown. Other processing nodes 12B–12D may be configured similarly. Other embodiments are possible and contemplated. In the embodiment of FIG. 10, processing node 12A includes interface logic 18A, 18B, and 18C and memory controller 16A. Additionally, processing node 12A includes a processor core 52 and a cache 50, packet processing logic 58, and may optionally include a second processor core 56 and a second cache 54. Interface logic 18A–18C are coupled to packet processing logic 58. Processor cores 52 and 56 are coupled to caches 50 and 54, respectively. Caches 50 and 54 are coupled to packet processing logic 58. Packet processing logic 58 is coupled to memory controller 16A.

Generally, packet processing logic 58 is configured to respond to control packets received on the links to which processing node 12A is coupled, to generate control packets in response to caches 50 and 54 and/or processor cores 52 and 56, to generate probe commands and response packets in response to transactions selected by memory controller 16A for service, and to route packets for which node 12A is an intermediate node to another of interface logic 18A–18C for transmission to another node. Interface logic 18A, 18B, and 18C may include logic to receive packets and synchronize the packets to the internal clock used by packet processing logic 58.

Packet processing logic 58 may include the hardware to support resource independence of the virtual channels supported by computer system 10. For example, packet processing logic 58 may provide separate buffers for each virtual channel. An exemplary embodiment is illustrated below as FIG. 11. Alternative embodiments may provide the hardware for providing resource independence of the virtual channels within interface logic 18A–18C, or any other suitable location.

Caches 50 and 54 comprise high speed cache memories configured to store cache blocks of data. Caches 50 and 54 may be integrated within respective processor cores 52 and 56. Alternatively, caches 50 and 54 may be coupled to processor cores 52 and 56 in a backside cache configuration or an in-line configuration, as desired. Still further, caches 50 and 54 may be implemented as a hierarchy of caches. Caches which are nearer processor cores 52 and 56 (within the hierarchy) may be integrated into processor cores 52 and 56, if desired.

Processor cores 52 and 56 include the circuitry for executing instructions according to a predefined instruction set. For example, the x86 instruction set architecture may be selected. Alternatively, the Alpha, PowerPC, or any other instruction set architecture may be selected. Generally, the processor cores access the caches for data and instructions. If a cache miss is detected, a read request is generated and transmitted to the memory controller within the node to which the missing cache block is mapped.

Figure 11:
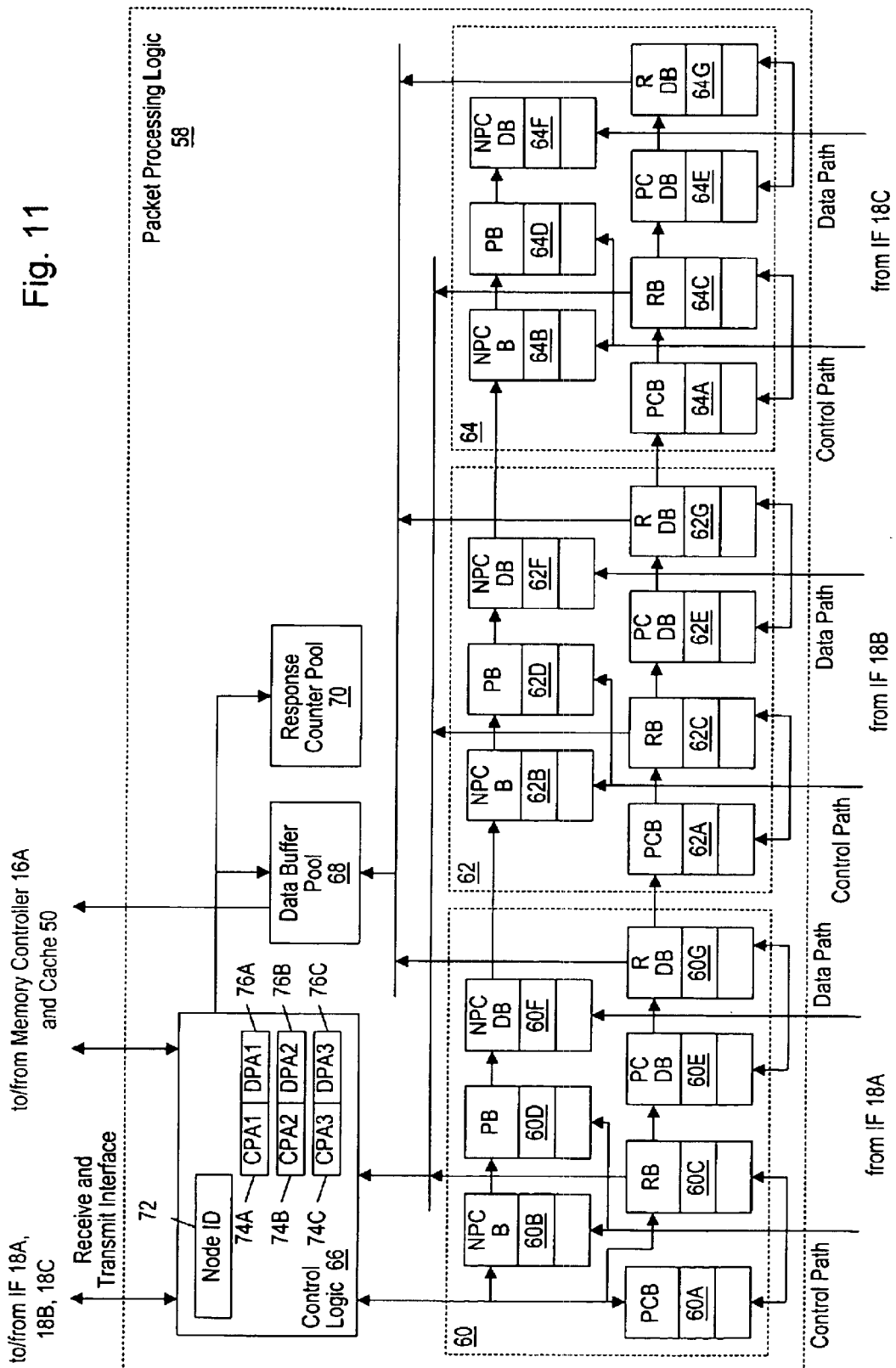
FIG. 11 is a block diagram of one embodiment of a packet processing logic shown in FIG. 10.

Turning now to FIG. 11, a block diagram of one embodiment of packet processing logic 58 is shown. Other embodiments are possible and contemplated. In the embodiment of FIG. 11, packet processing logic 58 includes a first set of control and data packet buffers 60, a second set of control and data packet buffers 62, a third set of control and data packet buffers 64, control logic 66, a data buffer pool 68, and a response counter pool 70. Control and data packet buffers 60 include a posted command buffer (PCB) 60A, a non-posted command buffer (NPCB) 60B, a response buffer (RB) 60C, a probe buffer (PB) 60D, a posted command data buffer (PCDB) 60E, a non-posted command data buffer (NPCDB) 60F and a response data buffer (RDB) 60G. Similarly, control and data packet buffers 62 include a posted command buffer (PCB) 62A, a non-posted command buffer (NPCB) 62B, a response buffer (RB) 62C, a probe buffer (PB) 62D, a posted command data buffer (PCDB) 62E, a non-posted command data buffer (NPCDB) 62F and a response data buffer (RDB) 62G. Control and data packet buffers 64 include a posted command buffer (PCB) 64A, a non-posted command buffer (NPCB) 64B, a response buffer (RB) 64C, a probe buffer (PB) 64D, a posted command data buffer (PCDB) 64E, a non-posted command data buffer (NPCDB) 64F and a response data buffer (RDB) 64G. Control and data packet buffers 60 are coupled to receive packets received by interface logic 18A (e.g. on lines 24B). Similarly, control and data packet buffers 62 are coupled to receive packets received by interface logic 18B and control and data packet buffers 64 are coupled to receive packets received by interface logic 18C. Control and data packet buffers 60, 62, and 64 are coupled to control logic 66. Additionally, response data buffers 60G, 62G, and 64G are coupled to data buffer pool 68. Data buffer pool 68 and response counter pool 70 are coupled to control logic 66, which further includes a node ID register 72, control packet active registers 74A–74C and data packet active register 76A–76C. Control logic 66 is coupled to interfaces 18A–18C via a receive and transmit interface, and is coupled to memory controller 16A and cache 50 (and optional cache 54) as well. Data buffer pool 68 is further coupled to memory controller 16A and cache 50 (and optional cache 54).

Each set of control and data packet buffers provides different buffers for each of the virtual channels. Namely, in the present embodiment, posted command buffer 60A is assigned to the posted command virtual channel, non-posted command buffer 60B is assigned to the non-posted command virtual channel, response buffer 60C is assigned to the response virtual channel, and probe buffer 60D is assigned to the probe virtual channel. In this manner, receipt of control packets in one virtual channel is not impeded by receipt of control packets in another virtual channel. Control packets from each virtual channel are stored into the control packet buffer corresponding to that virtual channel, and hence do not physically conflict with control packets from another virtual channel (which are stored in a different control packet buffer). Similarly named buffers within buffers 62 and 64 are assigned to the virtual channels as described above.

Similarly, data packet buffers are provided for each virtual channel which carries data packets (the probe virtual channel does not carry data packets in the present embodiment). Namely, in the present embodiment, posted command data buffer 60E is assigned to the posted command virtual channel, non-posted command data buffer 60F is assigned to the non-posted command virtual channel, and response data buffer 60G is assigned to the response virtual channel. Similarly named buffers within buffers 62 and 64 are assigned to the virtual channels as described above.

In the present embodiment, interface logic 18A–18C is configured to divide received packets into control packets (provided on the control path) and data packets (provided on the data path). The control path is coupled to the control packet buffers (e.g. buffers 60A–60D are coupled to the control path from interface logic 18A), and the data path is coupled to the data packet buffers (e.g. buffers 60E–60G are coupled to the data path from interface logic 18A). Control logic 66 is coupled to receive an indication of the packet via the receive and transmit interface, and is configured to allocate a buffer entry for the packet being received. In other contemplated embodiments, the received packets are not divided into control and data packets by the interface logic. In such embodiments, control logic 66 may receive the CTL signal to distinguish bit times of data packets and bit times of control packets.

Generally, control logic 66 is configured to process packets from the various buffers independent of the packets in the other buffers. Accordingly, packets travelling in different virtual channels do not physically conflict with each other.

Control logic 66 examines control packets within buffers 60, 62, and 64 to determine if the control packets are destined for node 12A ("this node") or are to be forwarded to another node. Node ID register 72 stores the node ID of this node, and control logic 66 may use the Node ID to determine whether or not control packets are destined for this node. In the present embodiment, packets in the probe virtual channel are broadcast packets and hence are destined for this node and for other nodes to which this node is to transmit the packet (and thus a node ID comparison is not used). Packets in the other virtual channels are directed packets for which the destination node field identifies whether the packet is destined for this node or is to be forwarded to another node. Control logic 66 may include one or more routing tables which indicate, for each destination node, which of the interface logic 18A–18C is to be used to forward the packet. Control logic 66 may forward the control packet when the receiving node coupled to receive packets transmitted via the identified interface logic 18A–18C has a free control packet buffer for the virtual channel corresponding to the control packet. Additionally, if the control packet specifies a data packet, a free data packet buffer for the virtual channel corresponding to the control packet is identified before forwarding the control packet followed by the specified data packet. Control logic 66 determines if the control packet (and the data packet, if specified) is to be forwarded and forwards the packet using the receive and transmit interface to the identified interface logic 18A–18C, which subsequently forwards the packet to the receiving node. Also, control logic 66 notes that a buffer of the corresponding type has been freed, so that a subsequent info packet may be transmitted via the interface 18A–18C upon which the packet was received by node 12A to indicate the freed buffer to the transmitting node on the receiving interface.

On the other hand, if the control packet is destined for this node, control logic 66 processes the packet based upon the type of packet. For example, if the control packet is a command targeted at the memory controller 16A, control logic 66 attempts to convey the control packet to memory controller 16A. Memory controller 16A may employ queues for transactions to be processed, and may refuse a control packet if the queues are full, for example. To process probe packets, control logic 66 may communicate with caches 50 and 54 (and any caches internal to the processor cores 52 and 56) to determine the status of the addressed cache block. Control logic 66 may generate a probe response packet with the status (or a read response packet with the data, if the cache block is modified within the node) and transmit the probe response packet (subject to receiving node buffers being available).

In addition to processing received packets, control logic 66 may generate packets in response to fill requests and victim blocks from the caches 50 and 54, as well as packets in response to requests directly from processor cores 52 and 56 (e.g. noncacheable requests, I/O requests, etc.). Still further, response packets may be generated in response to the memory controller providing data for transmission or completing a transaction. Control logic 66 may generate a probe command packet in response to memory controller 16A selecting a corresponding command for processing, and may broadcast the probe command packet (subject to receiving node buffers being available, as with other packet transmissions).

As mentioned above, a node provides sufficient resources to process response packets corresponding to a control packet generated by that node. In the present embodiment, control logic 66 may generate packets which may result in response packets being returned to the node in two cases: (i) when generating a command packet to initiate a transaction (e.g. in response to requests from caches 50 and 54 or processor cores 52 and 56); and (ii) when generating a probe packet for a control packet targeting memory controller 16A. More particularly, case (ii) may occur for sized writes targeting memory controller 16A. In either case, control logic 66 allocates resources to provide for processing of the response packets.

In the present embodiment, control logic 66 may allocate resources from data buffer pool 68 and response counter pool 70 for processing responses. Data buffer poof 68 may include a plurality of entries for storing cache blocks of data, while response counter pool 70 may comprise a plurality of counters. A data buffer pool entry may be allocated to store response data corresponding to the transaction. A counter may be allocated to count the responses received (and retain any state information which may be provided in the probe responses). Response packets may be counted (until the expected number of responses is reached) using the allocated counter, and data received with a response packet may be stored in the allocated data buffer. It is noted that, at most, two response packets involved in a transaction may carry data (one from the targeted memory controller, if the Mem-Cancel response packet does not reach the memory controller prior to transmission of the response packet, and one from a probed node which had a modified cached copy of the data). In the case in which two data packets are received, the packet from the probed node is retained and the packet from the memory controller is discarded.

Once each of the expected responses is received and the response data has been received, control logic 66 may transmit the data to memory controller 16A or caches 50 or 54, depending upon the type of transaction which has been performed. For example, if the responses are probe responses generated in response to a probe command generated by packet processing logic 58, the response data may be transmitted to memory controller 16A. Alternatively, if the responses are due to a read transaction, the data may be transmitted to caches 50 or 54.

It is noted that data buffer pool 68 may be used to store data to be transmitted out of node 12A as well. For example, victim block data or write data for write commands sourced from node 12A may be stored in data buffer pool 68. Alternatively, separate buffers may be provided for this data. Furthermore, instead of providing a pool of buffers which may be used for various transactions, separate buffers may be provided by transaction type, as desired.

As used herein, a buffer is a storage element used to store one or more items of information for later retrieval. The buffer may comprise one or more registers, latches, flip-flops, or other clocked storage devices. Alternatively, the buffer may comprise a suitably arranged set of random access memory (RAM) cells. The buffer is divided into a number of entries, where each entry is designed to store one item of information for which the buffer is designed. Entries may be allocated and deallocated in any suitable fashion. For example, the buffer may be operated as shifting first-in, first-out (FIFO) buffer in which entries are shifted down as older entries are deleted. Alternatively, head and tail pointers may be used to indicate the oldest and youngest entries in the buffer, and entries may remain in a particular storage location of the buffer until deleted therefrom. The term "control logic" as used herein, refers to any combination of combinatorial logic and/or state machines which performs operations on inputs and generates outputs in response thereto in order to effectuate the operations described.

In one particular embodiment, packets are received from interface logic 18A–18B as a series of bit times. Interface logic 18A–18C indicate whether control or data bit times are being transmitted, and control logic 66 causes the appropriate buffers to store the bit times. Control logic 66 may use control packet active registers 74 and data packet active registers 76 to identify which virtual channel a control packet or data packet which is currently being received belongs to. A control packet active register 74 is provided for each interface logic 18A–8C (e.g. control packet active register 74A may correspond to interface 18A). Similarly, a data packet active register 76 is provided for each interface logic 18A–18C (e.g. data packet active register 76A may correspond to interface 18A). In response to the first bit time of a control packet, control logic 66 decodes the command field (which is in the first bit time) and determines to which virtual channel the control packet is assigned. Control logic 66 allocates a buffer entry in the corresponding control packet buffer (within the set corresponding to the interface logic 18A–18C from which the control packet is received) and sets the control packet active register 76 corresponding to the interface logic 18A–18C from which the packet is received to indicate that control packet buffer. Subsequent control packet bit times from the same interface logic 18A–18C are stored into the indicated entry in the indicated buffer until each bit time of the control packet is received. If the control packet specifies a data packet, control logic 66 allocates a data packet buffer entry in the data packet buffer corresponding to the identified virtual channel. Data packet bit times are stored into the indicated entry of the indicated buffer until each bit time of data is received. In an alternative embodiment, interface logic 18A–18C may gather the bit times of a packet and transmit the packet as a whole to packet processing logic 58. In such embodiment, control packet active registers 74 and data packet active registers may be eliminated. In yet another embodiment, interface logic 18A–18C may gather several bit times for concurrent transmission to packet processing logic 58, but the number of bit times may be less than a packet. In still another embodiment, buffers 60, 62, and 64 may be located within the respective interface logic 18A–18C instead of packet processing logic 58.

The embodiment shown in FIG. 11 provides separate sets of buffers for each interface logic 18A–18C. In an alternative embodiment, the buffers may be provided as a pool (of each virtual channel type) which may be divided between the interface logic. Such an embodiment may make efficient use of the buffers by providing zero buffers to interface logic which is not coupled to another node (e.g. interface logic 18C in the example of FIG. 1). The buffers which would otherwise have been allocated to interface logic 18C may be allocated for use by interface logic 18A–18B.

Figure 12:
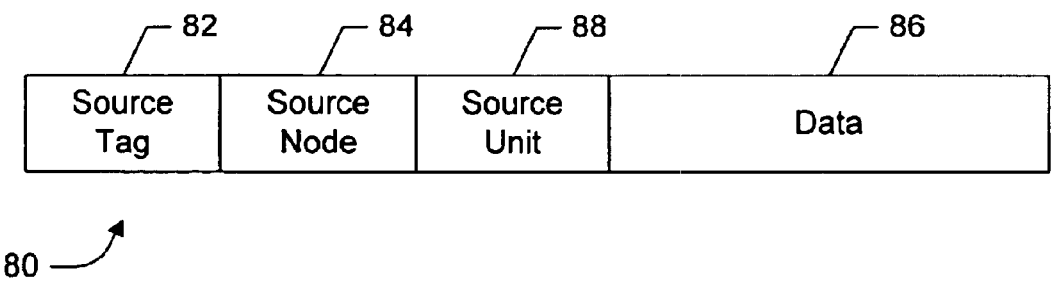
FIG. 12 is a block diagram illustrating one embodiment of a data buffer pool entry.

Turning next to FIG. 12, a diagram illustrating one embodiment of a data buffer pool entry 80 which may be within data buffer pool 68 is shown. Other embodiments are possible and contemplated. In the embodiment of FIG. 12, data buffer pool entry 80 includes a source tag field 82, a source node field 84, a source unit field 88, and a data field 86.

When control logic 66 allocates data buffer pool entry 80 to store a response data packet for a transaction, control logic 66 may store the source node, source unit, and source tag of the transaction in the source node field 84, source unit field 88, and the source tag field 82, respectively. Since the source node, source unit, and source tag uniquely identify an outstanding transaction, and the source node, source unit, and source tag are carried by response packets corresponding to the outstanding transaction, the response packets (and corresponding data packets) of the transaction may be identified and the data packet stored into the allocated entry. In other words, when a response packet specifying a response data packet is received, the source node, source unit, and source tag of the response packet may be compared against source node field 84, source unit field 88, and source tag field 84 to locate the data buffer pool entry 80 previously allocated for response data and the data may be copied from the response data buffer into the data field 86 of the data buffer pool entry 80. Data field 86 may comprise a cache block of data.

Figure 13:
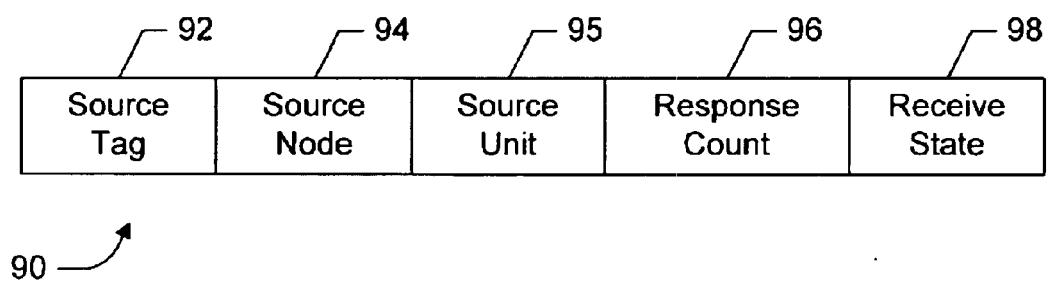
FIG. 13 is a block diagram illustrating one embodiment of a response counter pool entry.

Turning next to FIG. 13, a diagram illustrating one embodiment of a response counter 90 which may be within response counter pool 70 is shown. Other embodiments are possible and contemplated. In the embodiment of FIG. 13, response counter 90 includes a source tag field 92, a source node field 94, a source unit field 95, a response count field 96, and a receive state field 98.

When control logic 66 allocates response counter 90 to store a response count for a transaction, control logic 66 may store the source node, source unit, and source tag of the transaction in the source node field 94, the source unit field 95, and the source tag field 92, respectively. The source node field 94, source unit field 95, and source tag field 92 may be used similar to the corresponding fields 84, 88, and 82 of the data buffer pool entry 80.

Response count field 96 may be initialized, upon allocation to a transaction, to the number of responses expected for that transaction. As response packets having the source node, source unit, and source tag stored in fields 94, 95, and 92, respectively, are received, the response count may be decremented. When the response count reaches zero, all responses have been received and the transaction may be committed. Alternatively, the count may be initialized to zero and the response packets may cause increment of the response count until the expected number of response are received.

Receive state field 98 may be used to indicate the state that the data may be received in. The state indicates the access rights to the cache block, as well as the responsibilities for maintaining coherency for the cache block, that node 12A acquired in receiving the cache block. For example, the MOESI (Modified, Owned, Exclusive, Shared, and Invalid) coherency states may be employed and receive state field 98 may be encoded to one of the supported states. Alternatively, any other suitable set of coherency states may be employed (e.g. the MESI states). Receive state field 98 may be initialized to the state which would be acquired if no other node has a copy of the cache block being transferred by the transaction. As probe responses are received, if a response indicates that a copy of the cache block is being maintained by the probe node or that dirty data is being provided, receive state field 98 may be updated accordingly. In one embodiment, a shared bit may be included in the probe response packet to indicate that a copy of the cache block is being maintained by the probed node providing the probe response. Additionally, receiving a read response packet from a probed node may indicate that the node had a dirty copy of the cache block. The read response packet may also include the shared bit to indicate whether or not a copy is being maintained by the probed node.

It is noted that data buffer pool 68 and response counter pool 70 are only one example of allocating resources to handle responses for outstanding transactions. In another embodiment, a table of outstanding transactions may be maintained. The table may include the source node, source unit, source tag, data, receive state, and response count similar to the above (or equivalent information allowing control logic 66 to determine that all responses have been received). Any suitable set of resources may be used.

Figure 14:
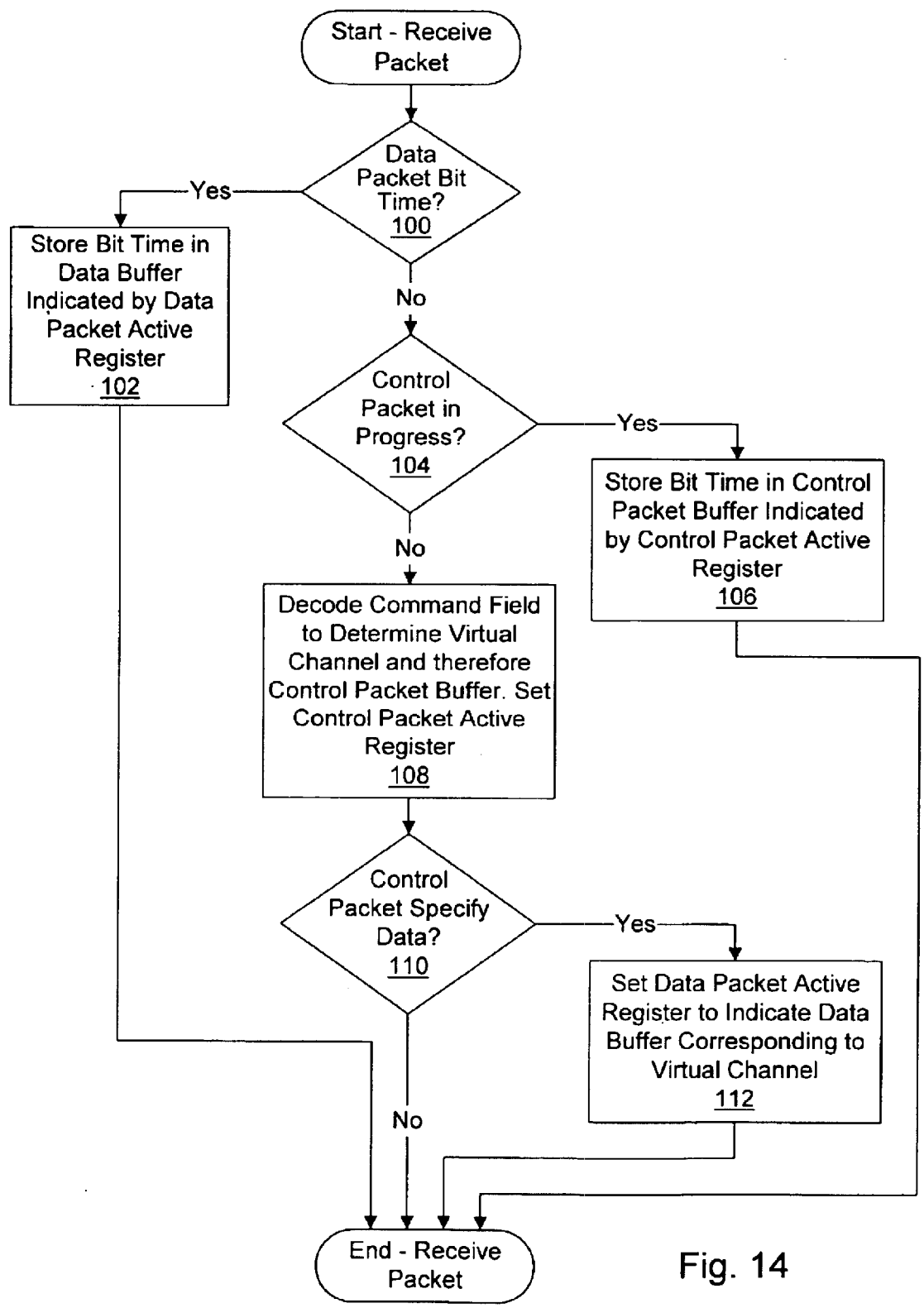
FIG. 14 is a flowchart illustrating operation of one embodiment of the packet processing logic shown in FIG. 10 for packet reception.

Turning now to FIG. 14, a flowchart is shown illustrating operation of one embodiment of packet processing logic 58 for receiving a packet. Other embodiments are possible and contemplated. The embodiment illustrated receives packets into packet processing logic 58 as a series of bit times. Other embodiments may accumulate the bit times of a packet in interface logic 18A–18C and provide the complete packets to packet processing logic 58, in which cases steps related to managing the receipt of packets in bit times may be eliminated. While the steps shown in FIG. 14 are illustrated in a particular order for ease of understanding, any suitable order may be used. Additionally, steps may be performed in parallel using combinatorial logic within packet processing logic 58. The steps illustrated in FIG. 14 may be performed in parallel and independently for each interface logic 18A–18C, since bit times may be received concurrently from each interface logic.

Packet processing logic 58 receives a signal from the interface logic indicating whether the received bit time is part of a data packet or a command packet. If the bit time is a data packet bit time (decision block 100), the bit time is stored in the data buffer (and entry within the data buffer) indicated by the data packet active register corresponding to that interface logic (step 102). If the data packet bit time is the last bit time of the data packet, control logic 66 may invalidate the corresponding data packet active register. On the other hand, if the bit time is a control packet bit time, packet processing logic 58 determines if a control packet is currently in progress of being received (e.g., if the control packet active register is valid, decision block 104). If a control packet is currently in progress, the bit time is stored in the control packet buffer indicated by the control packet active register (step 106). If the control packet bit time is the last bit time of the control packet, control logic 66 may invalidate the corresponding control packet active register.

Alternatively, a control packet may not be currently in progress. In this case, packet processing logic 58 decodes the command field of the newly received control packet to identify the virtual channel to which the control packet belongs (step 108). A control packet buffer entry corresponding to the identified virtual channel is allocated, and the control packet bit time is stored into the allocated control packet buffer entry.

Additionally, packet processing logic 58 determines if the control packet specifies a subsequent data packet (decision block 110). If a data packet is specified, packet processing logic 58 assigns a data buffer entry from the data buffer corresponding to the identified virtual channel and updates the data packet active register to indicate that data buffer (and entry) (step 112).

Figure 15:
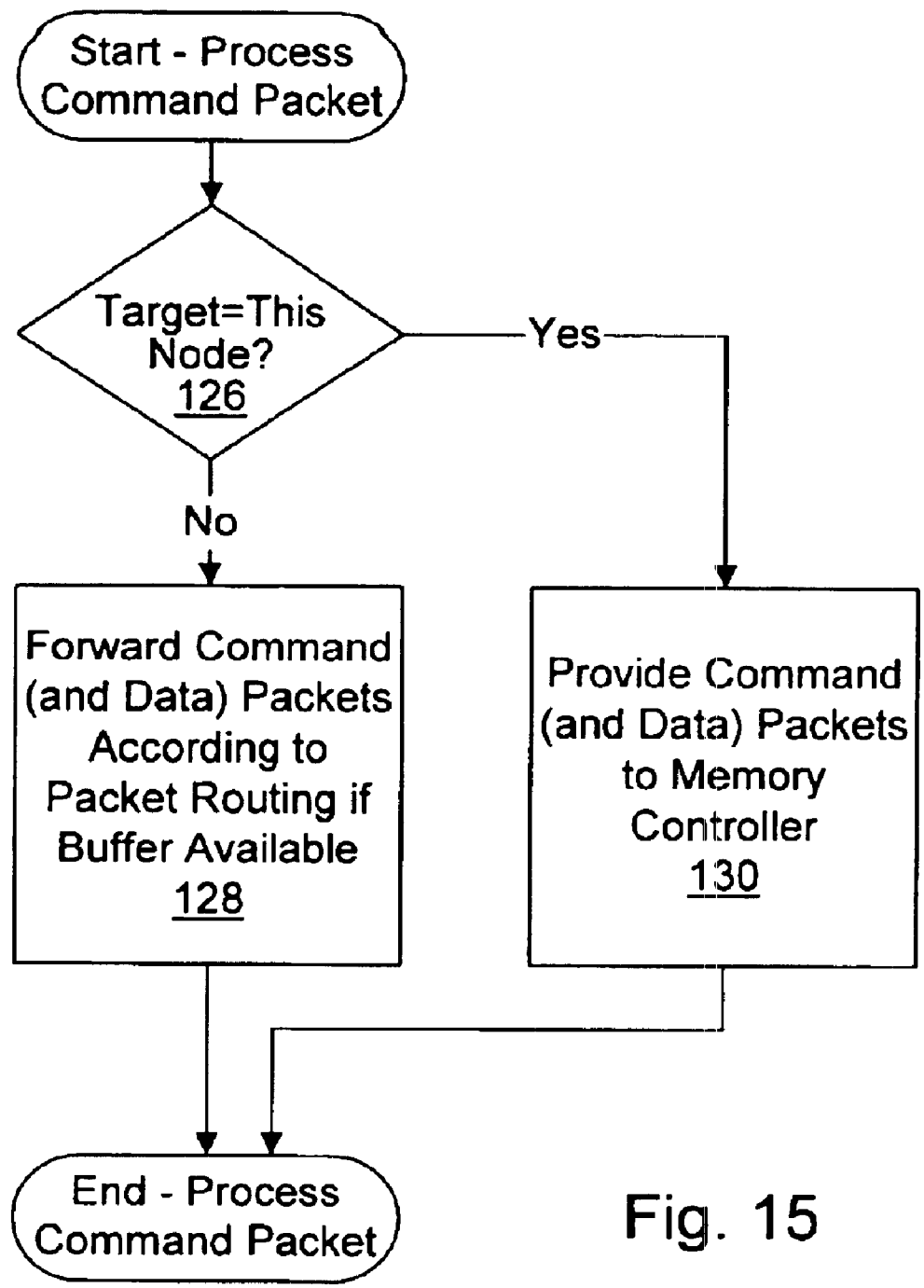
FIG. 15 is a flowchart illustrating operation of one embodiment of the packet processing logic shown in FIG. 10 for processing command packets.

Turning now to FIG. 15, a flowchart is shown illustrating operation of one embodiment of packet processing logic 58 for processing a command packet (e.g. a non-posted command packet or a posted command packet). Other embodiments are possible and contemplated. While the steps shown in FIG. 15 are illustrated in a particular order for ease of understanding, any suitable order may be used. Additionally, steps may be performed in parallel using combinatorial logic within packet processing logic 58. The steps illustrated in FIG. 15 may be performed in parallel and independently for each interface logic 18A–18C and/or each command packet buffer, since command packets from different interfaces and/or different virtual channels are physically independent. Alternatively, one command packet (or one command packet per interface logic 18A–18C) may be selected for processing according to a suitable fairness algorithm. Generally, packets selected from one virtual channel for processing obey the ordering rules for packets within a virtual channel (e.g. packets from the same source to the same destination are selected in order) but packets may be selected for processing out of order, if desired and the ordering rules allow such selection.

Packet processing logic 58 determines if the target of the command packet is this node (decision block 126). For example, packet processing logic 58 may compare the destination node recorded in the destination node field of the command packet to the node ID stored in node ID register 72. If the nodes match, then the command is targeted at this node. If the command is not targeted at this node, packet processing logic 58 may forward the command packet (and corresponding data packet, if specified) in response to the destination node (step 128). For example, packet processing logic 58 may maintain packet routing tables which identify one of interface logic 18A–18C as the transmitting interface to forward packets to a particular destination node. Packet processing logic 58 forwards the command packet subject to a corresponding command buffer (and data buffer, if a data packet is specified) being available in the receiving node coupled to the link specified by the packet routing table. Additionally, if the command packet specifies a data packet, the forwarding of the command packet may be stalled if a data packet on the transmitting link is active but has not yet been transmitted.

If the command packet is targeted at this node, packet processing logic 58 may provide the command packet (and corresponding data packet, if applicable) to memory controller 16A (step 130). It is noted that, once the command packet is processed (either forwarded or accepted by this node), the command packet is removed from the command buffer entry (and the data is removed from the command data buffer entry, if applicable).

It is noted that probe commands may be processed in a similar fashion, although probe commands do not specify a subsequent data packet and thus the checks for data packet may be ignored. Furthermore, the probes may be both processed internally (e.g. by probing caches within the node) and forwarded, since they are broadcast packets. The node may generate and transmit a probe response packet after probing the caches.

It is noted that, if a selected command packet specifies a corresponding data packet, various embodiments may process the command packet even if the data packet has not yet been received, or may await arrival of the data packet to simplify forwarding of the data or to allow another control packet which specifies a data packet which is complete to be forwarded on the same link. If the data packet has not been received when the command packet is processed, the data packet may be handled as described above when the data packet is received.

Figure 16:
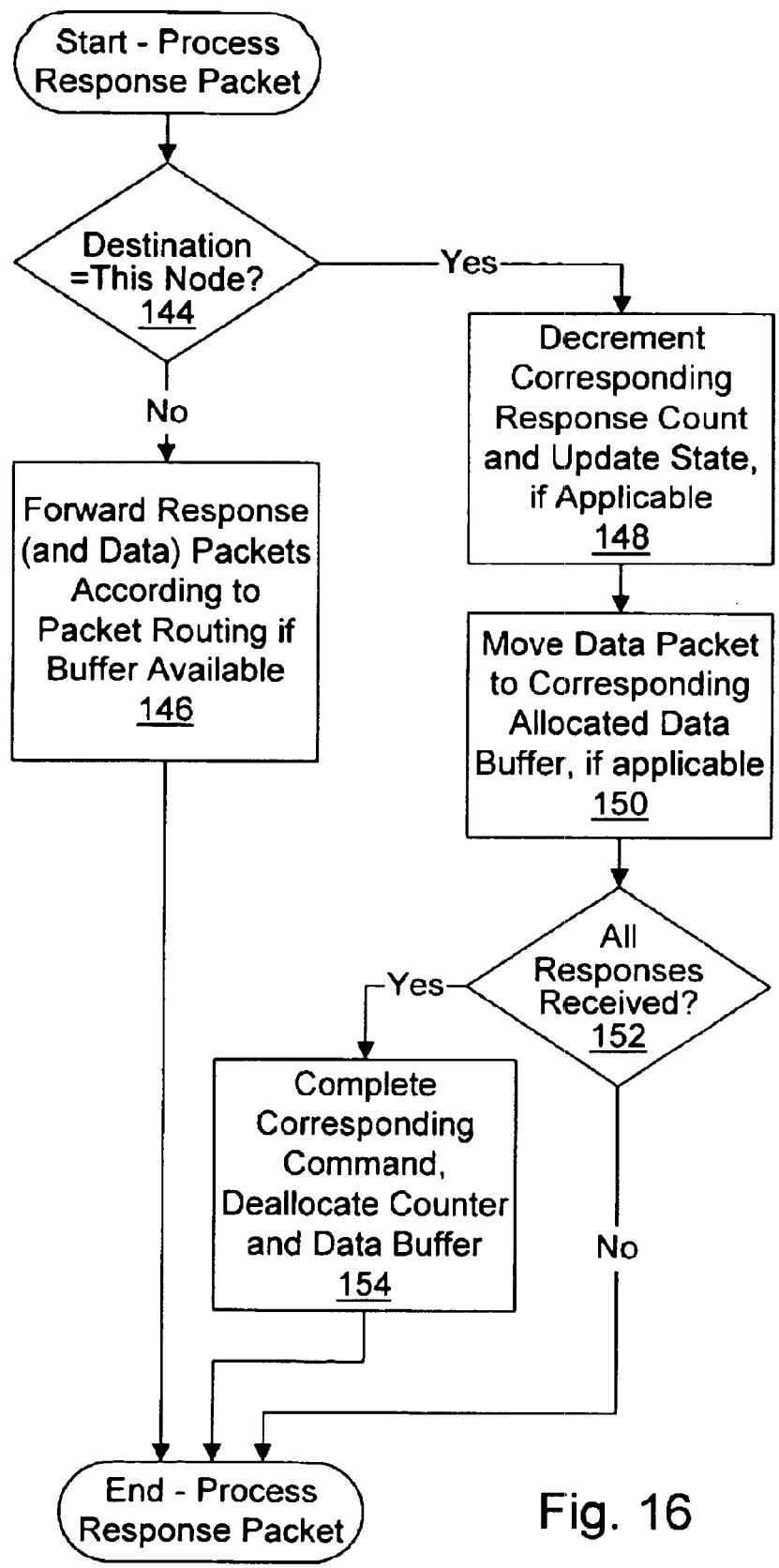
FIG. 16 is a flowchart illustrating operation of one embodiment of the packet processing logic shown in FIG. 10 for processing a response packet.

Turning now to FIG. 16, a flowchart is shown illustrating operation of one embodiment of packet processing logic 58 for processing a response packet. Other embodiments are possible and contemplated. While the steps shown in FIG. 16 are illustrated in a particular order for ease of understanding, any suitable order may be used. Additionally, steps may be performed in parallel using combinatorial logic within packet processing logic 58. The steps illustrated in FIG. 16 may be performed in parallel and independently for each interface logic 18A–18C and/or each response packet buffer, since command packets from different interfaces and/or different virtual channels are physically independent.

Packet processing logic 58 determines if the destination node of the response packet is this node (decision block 144). If the destination node is another node, packet processing logic 58 forwards the response packet (and corresponding data packet, if applicable) subject to a free buffer entry for the response virtual channel in the receiver on the link to which the response packet is forwarded (step 146).

If the destination node of the response packet is this node, packet processing logic 58 is configured to decrement the corresponding response counter and update the received state, if the response is a probe response indicating that the received state should be changed from the default state (step 148). Additionally, if the response packet specifies a data packet, the data packet is moved from the corresponding response data buffer to the data buffer allocated to that response (step 150).

After decrementing the counter, packet processing logic may test the counter to determine if all the response packets have been received and processed (decision block 152. If the determination is that all the response packets have been received and processed, packet processing logic 58 may inform memory controller 16A or caches 50 and 54 that they may complete the command, and provide the associated data from the data buffer and received state from the response counter (if applicable step 154). It is noted that, once the response packet is processed (either forwarded or accepted by this node), the response packet is removed from the response buffer entry (and response data buffer entry, if applicable).

In the above discussions, the term "suspension" of processing of a command packet or response packet has been used. Generally, the processing is "suspended" if the processing of that particular packet is stopped until the reason for suspension is eliminated. Other packets of the same type may be processed during the time that the suspension of processing of that command or response.

It is noted that, if a selected response packet specifies a corresponding data packet, various embodiments may process the response packet even if the data packet has not yet been received (i.e. the data packet is not yet in the data buffer), or may await arrival of the data packet to simplify forwarding of the data or to allow another control packet which specifies a data packet which is complete to be forwarded on the same link. If the data packet has not been received when the response packet is processed, the data packet may be handled as described above when the data packet is received.

Figure 17:
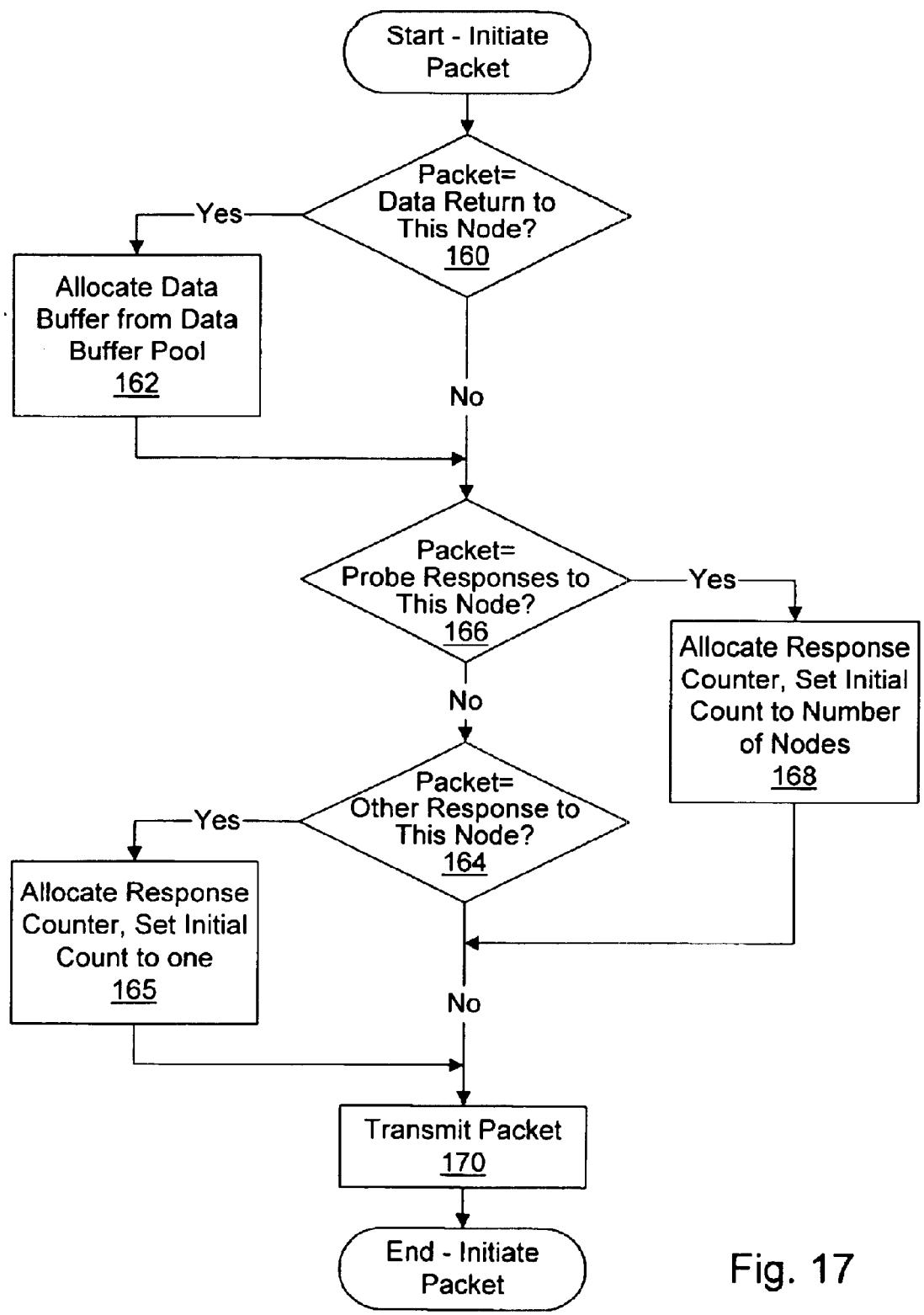
FIG. 17 is a flowchart illustrating operation of one embodiment of the packet processing logic shown in FIG. 10 for initiating a packet.

Turning now to FIG. 17, a flowchart is shown illustrating operation of one embodiment of packet processing logic 58 for initiating a packet on the links to which the node is coupled. Other embodiments are possible and contemplated. While the steps shown in FIG. 17 are illustrated in a particular order for ease of understanding, any suitable order may be used. Additionally, steps may be performed in parallel using combinatorial logic within packet processing logic 58. Packet processing logic 58 may initiate packets on the link in response to fill requests/victim blocks from the caches 50 and 54 and/or operations performed by cores 52 and 56. Additionally, probe packets may be initiated in response to the memory controller 16A selecting a memory operation for processing. Response packets may be initiated after probes have been processed, and in response to a transaction sourced by this node or targeted at this node being completed.

Packet processing logic 58 determines if the packet to be initiated may result in data being return to this node (decision block 160). For example, read transactions initiated by the node cause data to be returned to the node, while write transactions initiated by the node do not cause data to be returned to the node. ChangetoDirty transactions may result in data being returned to the node (if another node has the affected cache block in a dirty state). Similarly, probe packets may cause data to be returned to this node if another node has the affected cache block in a dirty state and the probe responses are to be directed at this node. If the transaction may result in data being returned to this node, packet processing logic 58 allocates a data buffer from data buffer pool 68 (step 162).

Additionally, packet processing logic 58 determines if probe responses will be returned to this node in response to the packet (step 166). This may occur if the packet is a probe, or if the packet is initiating a transaction resulting in probe responses to this node (e.g. a read transaction). If probe responses will be returned to this node, packet processing logic 58 allocates a response counter for responses to the transaction and initializes the response counter to the number of nodes in the coherent fabric (step 168).

Packet processing logic 58 further determines if other responses will be returned to this node (e.g. SrcDone, TgtDone, etc.) in response to the packet being initiated (step 164). If such other responses are to be returned, packet processing logic 58 allocates a response counter and sets the initial count to one (step 165). Subsequently, packet processing logic 58 transmits the packet (step 170).

By preallocating resources to handle response packets (including data) prior to initiating a transaction, response packets are processable upon receipt. Accordingly, even though some response packets may have logical/protocol conflicts with other response packets, response packets may be merged into the response virtual channel because physical conflicts may be eliminated by processing each response packet as it reaches its destination node.

Figure 18:
FIG. 18 is a block diagram illustrating one embodiment of an info packet including buffer release fields.

Turning next to FIG. 18, a block diagram illustrating one embodiment of an info packet 180 including buffer release fields is shown. Other embodiments are possible and contemplated. A buffer release field is included for each buffer type. The RespData field corresponds to the response data buffer. The Response field corresponds to the response buffer. Similarly, the PostCmdData field corresponds to the posted command data buffer and the PostCmd field corresponds to the posted command buffer; and the NonPostData field corresponds to the non-posted command data buffer and the NonPostCmd field corresponds to the non-posted command buffer. The Probe field corresponds to the probe buffer.

Each of the buffer release fields includes two bits, allowing for zero to three of each type of buffer to be freed in the transmission of one info packet 180 from a transmitter to a receiver on a single link. More than three entries may be provided in a buffer, and multiple info packets may be used to free more than three of one type. Packet processing logic 58 may include buffer counts for each type of buffer and each interface logic 18A–18C, indicating the total number of buffers of each type which are provided by the receiver on the other end of the link to which each interface is coupled. These counters may be initialized at power up by transmitting info packets from the receiver to the transmitter with the buffer release fields set to the number of buffers available in that receiver. More than three entries may be indicated by sending multiple info packets.

Packet processing logic 58 may transmit packets in a given virtual channel as long as a buffer of the corresponding type (and a data buffer, if the packet specifies a data packet) is available in the receiver to which the packets are being transmitted. Additionally, packet processing logic 58 notes the number of buffers of each type for each interface 18A–18C that are freed in node 12A due to the processing of packets by packet processing logic 58. Periodically, packet processing logic 58 transmits an info packet 180 via each interface logic 18A–18C, indicating to the transmitter on that link the number of buffer entries which have been freed by packet processing logic 58.

Virtual Channels—Noncoherent Fabric

Turning now to FIG. 19, a block diagram of one embodiment of an I/O subsystem 200 is shown. Other embodiments are possible and contemplated. In the embodiment of FIG. 19, I/O subsystem 200 includes a host bridge 202 and a plurality of I/O nodes 204A, 204B, and 204C. Host bridge 202 is coupled to processing node 12D via a coherent link comprising lines 241–24J, and is further coupled to I/O node 204A using a noncoherent link comprising lines 24K–24L. I/O nodes 204A–204C are interconnected using additional noncoherent links in a daisy chain configuration (lines 24N-24O).

Generally, an I/O node 204A–204C may initiate transactions within I/O subsystem 200. The transactions may ultimately be targeted at another I/O node 204A–204C, an I/O node on another noncoherent link, or a memory 14. For simplicity, transactions may be performed between the host bridge 202 and an I/O node 204A–204C despite its actual target. Host bridge 202 may initiate transactions within I/O subsystem 200 on behalf of a request from processing nodes 12A–12D, and may handle transactions initiated by I/O nodes 204A–204C which are targeted at the coherent fabric or another host bridge within the computer system. Accordingly, packets transmitted by an I/O node 204A–204C may flow toward host bridge 202 through the daisy chain connection (flowing "upstream"). Packets transmitted by host bridge 202 may flow toward the receiving I/O node 204A–204N (flowing "downstream"). By interconnecting the I/O nodes and the host bridge in a daisy chain and having I/O nodes communicate (at the transaction level) only with the host bridge provides a logical view of I/O subsystem 200 in which the I/O nodes appear to be connected directly to the host bridge but not the other nodes.

I/O subsystem 200 may be connected to a host bridge on both ends of the daisy chain interconnection to provide for robustness in the event of a link failure or to allow a shared I/O subsystem between clusters of processing nodes. One bridge would be defined as the master bridge and the other would be the slave bridge. In the absence of a link failure, all I/O nodes in the subsystem may belong to the master bridge. Upon detection of a link failure, the nodes on either side of the failure are reprogrammed to belong to the host bridge one the same side of the failure, thereby forming two different subsystems and maintaining communication with the processing nodes. The I/O nodes may be apportioned between the two host bridges in the absence of a failure (forming two logically separate chains) to balance traffic as well.

If a packet reaches the end of the daisy chain (e.g. I/O node 204C in the example of FIG. 19) and no I/O node 204A–204C accepts the packet, an error may be generated by the node at the end of the chain.

Figure 21:
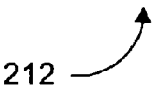
FIG. 21 is a block diagram of one embodiment of a command packet for the noncoherent link.
Figure 22:
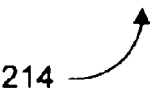
FIG. 22 is a block diagram of one embodiment of a response packet for the noncoherent link

Generally, I/O subsystem 200 may implement the links as a noncoherent interconnect. The data packet definition in the noncoherent link may be similar to that shown and described in FIG. 6, and the info packet definition in the non-coherent link may be similar to the packet definitions shown in FIGS. 3 and 18 (with the Probe field being reserved). The command and response packets are shown in FIGS. 21 and 22 below.

With respect to virtual channels, the noncoherent links may employ the same virtual channels as the coherent link described above. However, since probes are not used in the noncoherent link, the probe virtual channel may be eliminated. Table 42 shown in FIG. 9 illustrates the virtual channels defined for one embodiment of the noncoherent link.

It is noted that, while host node 202 is shown separate from the processing nodes 12, host node 202 may be integrated into a processing node, if desired.

Turning now to FIG. 20, a table 210 is shown illustrating packets employed according to one exemplary embodiment of the noncoherent link within computer system 10. Other embodiments are possible and contemplated, including any other suitable set of packets and command field encodings. Table 210 includes a command code column illustrating the command encodings assigned to each command, a virtual channel (Vchan) column defining the virtual channel to which the noncoherent packets belong, a command column naming the command, and a packet type column indicating which of command packets 30, 212, and 214 is employed for that command.

The Nop, WrSized, ReadSized, RdResponse, TgtDone, Broadcast, and Sync packets may be similar to the corresponding coherent packets described with respect to FIG. 7. However, in the noncoherent link, neither probe packets nor probe response packets are issued. Posted writes may again be identified by setting bit 5 of the WrSized command, as described above, and no TgtDone response may be issued for posted writes.

The flush command may be used by a node to ensure that one or more previously performed posted commands have completed on the target interface. Generally, since posted commands are completed (e.g. receive the corresponding target done response) on the source interface prior to completing the command on the target interface, the source cannot determine when the posted commands have been flushed to their destination within the target interface. Executing a flush command (and receiving the corresponding TgtDone response packet) provides a means for the source node to determine that previous posted commands have been flushed to their destinations.

The Assign and AssignAck packets are used to assign Unit IDs to nodes. The master host bridge transmits assign packets to each node (one at a time) and indicates the last used Unit ID. The receiving node assigns the number of Unit IDs required by that node, starting at the last used Unit ID+1. The receiving node returns the AssignAck packet, including an ID) count indicating the number of Unit IDs assigned.

Turning next to FIG. 21, a block diagram of one embodiment of a command packet 212 which may be employed in the noncoherent link is shown. Command packet 212 includes the command field similar to the coherent packet. Additionally, an optional source tag field may be included in bit time 3 (SrcTag), similar to the coherent command packet. The address is included in bit times 5–8 (and optionally in bit time 4 for the least significant address bits). However, instead of a source node, a unit ID is provided.

Unit IDs serve to identify packets as coming from the same logical source (if the unit IDs are equal). However, an I/O node may have multiple unit IDs (for example, if the node includes multiple devices or functions which are logically separate). Accordingly, a node may accept packets having more than one unit ID. Additionally, since packets flow between the host bridge and a node, one of the nodes involved in a packet (the host bridge node) is implied for the packet. Accordingly, a single unit ID may be used in the noncoherent packets. In one embodiment, the unit ID may comprise 5 bits. Unit ID 0 may be assigned to the host bridge, and unit ID 31 may be used for error cases. Accordingly, up to 30 unit IDs may exist in the I/O nodes coupled into one daisy chain.

Additionally, command packet 212 includes a sequence ID field in bit times 1 and 2. The sequence ID field may be used to group a set of two or more command packets from the same unit ID and indicate that the set is ordered. More particularly, if the sequence ID field is zero, a packet is unordered. If the sequence ED field is non-zero, the packet is ordered with respect to other packets having the same sequence ID field value.

Still further, command packet 212 includes a PassPW bit in bit time 2. The Pass PW bit (or pass posted write bit) determines whether command packet 212 is allowed to pass posted writes from the same unit ID. If the pass posted write bit is clear, the packet is not allowed to pass a prior posted write. If the pass posted write bit is set, the packet is allowed to pass prior posted writes. For read packets, the command field includes a bit (e.g. bit 3, in one embodiment) which is defined as the "responses may pass posted writes" bit. That bit becomes the PassPW bit in the response packet corresponding to the read (shown in FIG. 22 below).

Turning next to FIG. 22, a block diagram of one embodiment of a response packet 214 which may be employed in the noncoherent link is shown. Response packet 214 includes the command field, unit ID field, source tag field, and PassPW bit similar to the command packet 212. Other bits may be included as desired.

Figure 23:
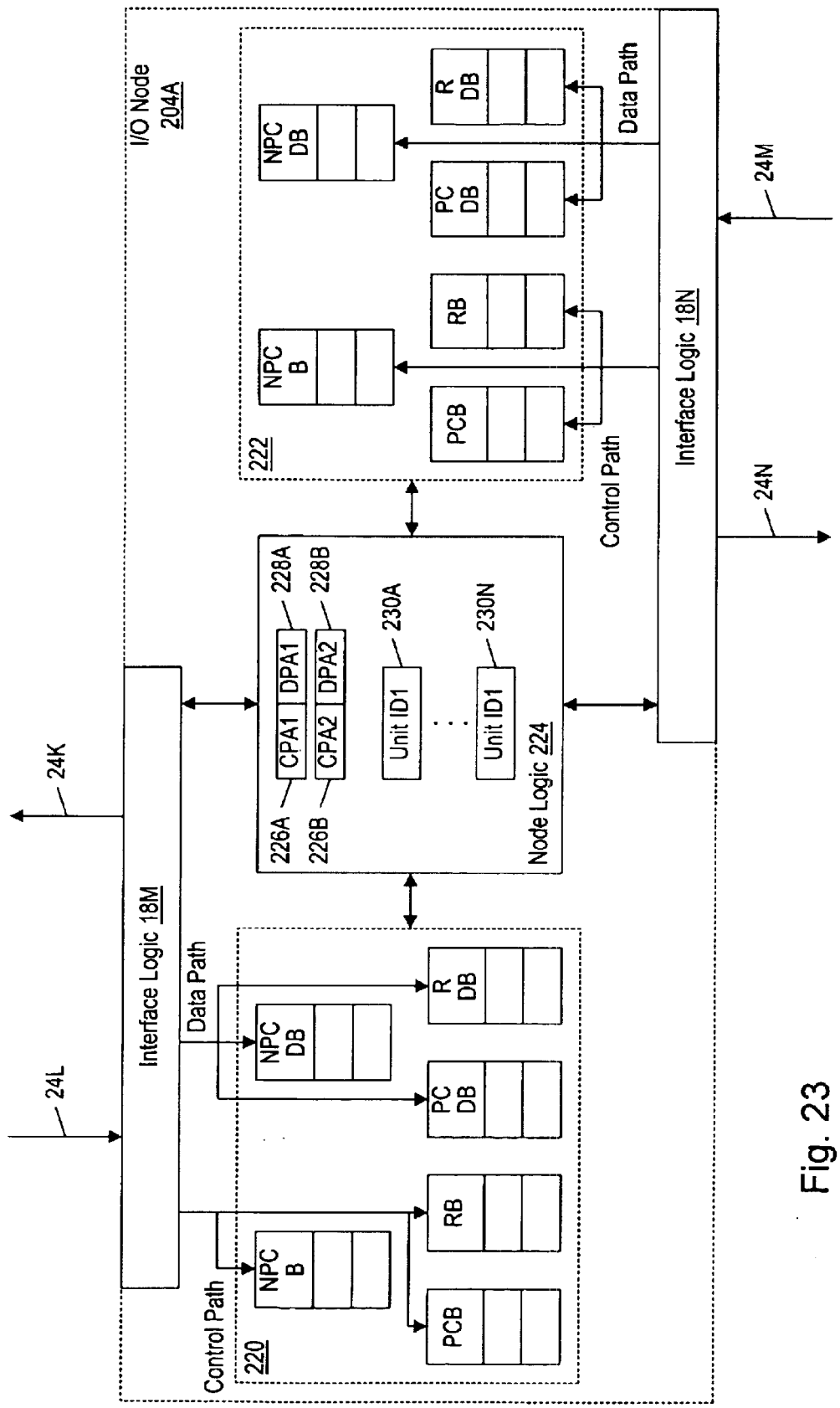
FIG. 23 is a block diagram of one embodiment of an I/O node.

Turning now to FIG. 23, a block diagram illustrating one embodiment of I/O node 204A is shown. Other I/O nodes 204B–204C may be configured similarly. Other embodiments are possible and contemplated. In the embodiment of FIG. 23, I/O node 204A includes interface logic 18M and 18N, a first set of packet buffers 220, a second set of packet buffers 222, and a node logic 224. Interface logic 18M is coupled to lines 24K and 24L, and to packet buffers 220 and node logic 224. Interface logic 18N is coupled to lines 24M and 24N, as well as to packet buffers 222 and node logic 224. Node logic 224 is further coupled to packet buffers 222 and 224.

Interface logic 18M and 18N are configured to receive packets from lines 24L and 24M (respectively) and to transmit packets on lines 24K and 24N (respectively). Similar to the interface logic described above for the coherent link, interface logic 18M and 18N may separate received packets into a control path and a data path. The control path is coupled to the control packet buffers and the data path is coupled to the data packet buffers. Alternatively, the interface logic may not separate received packets into control and data paths and node logic 224 may receive the CTL signal corresponding to each bit time to perform the separation. Similar to the coherent interface, packet buffers 220 and 222 include a posted command buffer (PCB), a non-posted command buffer (NCPB), and a response buffer (RB) for control packets, corresponding to the three virtual channels implemented in the noncoherent link. Additionally, data packet buffers are provided for each virtual channel (namely a posted command data buffer (PCDB), a non-posted command data buffer (NPCDB), and a response data buffer (RDB)).

Node logic 224 may process packets received into buffers 222 and 224, and may initiate packets in response to peripheral functionality implemented by I/O node 204A. Similar to control logic 66 shown in FIG. 11, node logic 224 may implement control packet active registers 226A and 226B (corresponding to packet buffers 222 and 224, respectively) and data packet active registers 228A and 228B (corresponding to packet buffers 222 and 224, respectively). Additionally, since the noncoherent link operates according to Unit IDs instead of Node IDs, node logic 224 may include one or more Unit ID registers 230A–230N to store the Unit IDs assigned to I/O node 204A. The number of Unit ID register 230A–230N may vary from node to node, according to the number of Unit IDs implemented within that node.

Since packets in different virtual channels are stored in different buffers within I/O node 204A, packets in different virtual channels do not physically conflict with each other. Hence, deadlock free operation may be provided. Additionally, node logic 224 may preallocate resources to handle response packets and response data (as described above) and hence response packets may be merged into a single virtual channel (as described above). It is noted that node logic 224 may further be configured to transmit and receive Nop packets similar to the packet shown in FIG. 18 (with the probe field reserved) to flow control buffers 220 and 222 (and similar buffers in other nodes) with respect to transmitting and receiving packets.

Node logic 224 may further include logic corresponding to the various I/O or peripheral functions performed by I/O node 204A. For example, I/O node 204A may include storage peripherals such as disk drives, CD ROMs, DVD drives, etc. I/O node 204A may include communications peripherals such as IEEE 1394, Ethernet, Universal Serial Bus (USB), Peripheral Component Interconnect (PCI) bus, modem, etc. Any suitable I/O function may be included in I/O node 204A.

Figure 24:
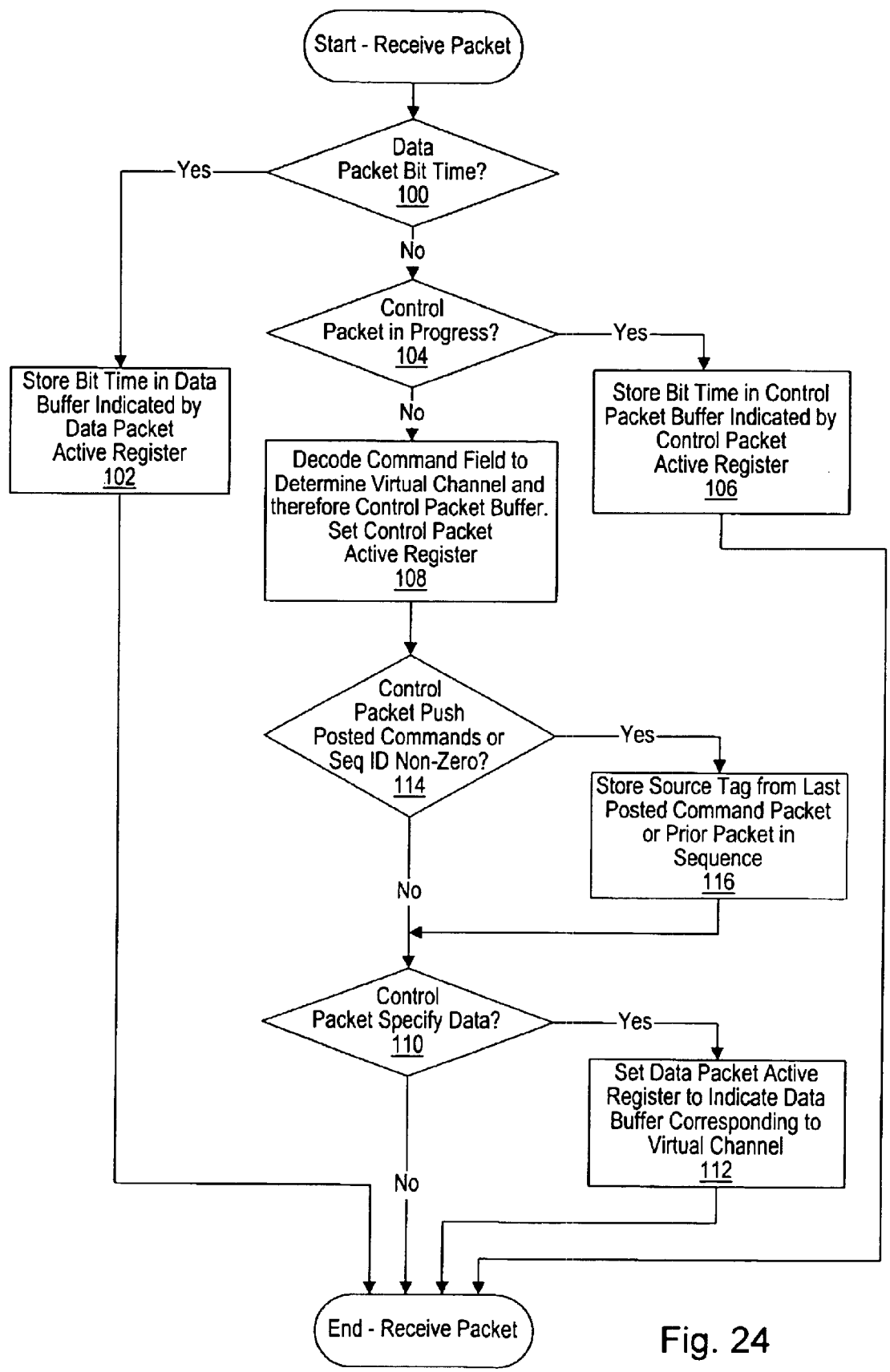
FIG. 24 is a flowchart illustrating operation of one embodiment of the node logic shown in FIG. 23 for packet reception.

Turning now to FIG. 24, a flowchart is shown illustrating operation of one embodiment of node logic 224 for receiving a packet. Other embodiments are possible and contemplated. The embodiment illustrated receives packets into buffers 220 and 222 as a series of bit times. Other embodiments may accumulate the bit times of a packet in interface logic 18M–18N and provide the complete packets to buffers 220 and 222, in which cases steps related to managing the receipt of packets in bit times may be eliminated. While the steps shown in FIG. 24 are illustrated in a particular order for ease of understanding, any suitable order may be used. Additionally, steps may be performed in parallel using combinatorial logic within node logic 224. The steps illustrated in FIG. 24 may be performed in parallel and independently for each interface logic 18M–18N, since bit times may be received concurrently from each interface logic.

Steps 100–112 may be similar to the correspondingly described steps of FIG. 14 above. Additionally, however, node logic 224 may implement certain additional ordering rules, as illustrated in part by steps 114 and 116. Certain control packets may be defined to "push" posted commands from the same source node. In other words, the posted commands arrive at the destination node prior to the other control packets reaching their destination nodes. In one embodiment, for example, flush commands (which are defined to have the PassPW bit clear) and other control packets having their the PassPW bit clear may be defined to push posted commands. Furthermore, command packets having non-zero sequence IDs are defined to push prior command packets having a matching sequence ID. Accordingly, if a control packet with the PassPW bit clear or having a non-zero sequence ID is received (decision block 114), node logic 224 may search: (i) the posted command buffer to determine if any posted commands from the same unit ID as the control packet having the clear PassPW bit are stored therein; and (ii) any command in either command virtual channel has a matching nonzero sequence ID. If such a prior command packet is detected, the source tag of that prior command may be recorded with the control packet (e.g. stored in the buffer entry assigned to the control packet—step 116). More particularly, the source tag of the last prior command from the same unit ID which meets the above criteria is saved. Node logic 224 may withhold processing of the control packet until the corresponding prior command packets have been processed.

Figure 25:
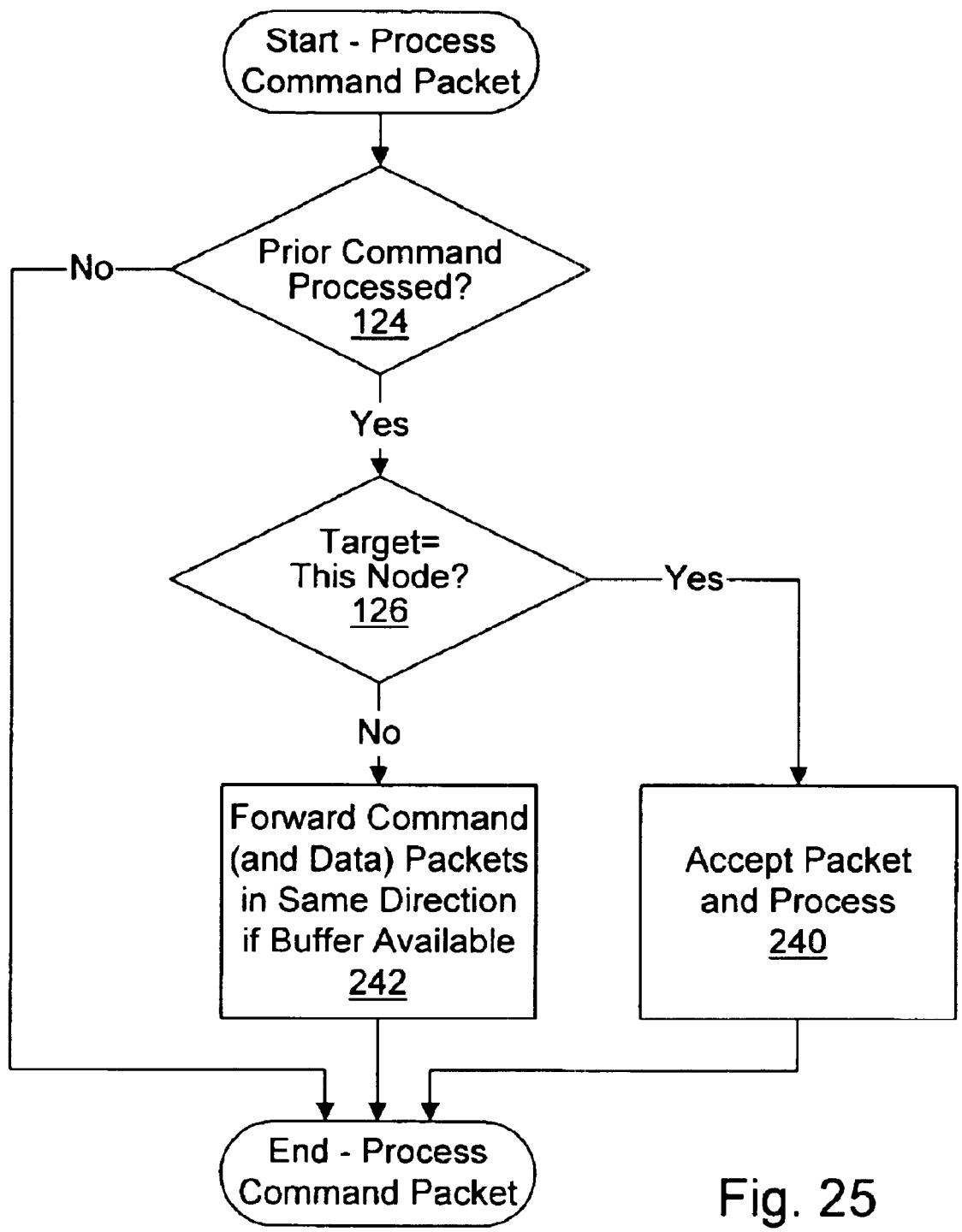
FIG. 25 is a flowchart illustrating operation of one embodiment of the node logic shown in FIG. 24 for processing command packets.

Turning now to FIG. 25, a flowchart is shown illustrating operation of one embodiment of node logic 224 for processing a command packet (e.g. a non-posted command packet or a posted command packet). Other embodiments are possible and contemplated. While the steps shown in FIG. 25 are illustrated in a particular order for ease of understanding, any suitable order may be used. Additionally, steps may be performed in parallel using combinatorial logic within node logic 224. The steps illustrated in FIG. 25 may be performed in parallel and independently for each interface logic 18M–18N and/or each command packet buffer, since command packets from different interfaces and/or different virtual channels are physically independent. Alternatively, one command packet (or one command packet per interface logic 18M–18N) may be selected for processing according to a suitable fairness algorithm. Generally, packets selected from one virtual channel for processing obey the ordering rules for packets within a virtual channel (e.g. packets from the same source to the same destination are selected in order) but packets may be selected for processing out of order, if desired and the ordering rules allow such selection.

Step 126 may generally be similar to the corresponding step of FIG. 15 (although based on unit IDs and unit ID registers 230A–230N). However, node logic 224 may implement an additional check prior to processing a command packet. In decision block 124, node logic 224 determines if the command packet is noted as pushing a prior command packet which has not been processed. As described above, if a command packet is received and is defined to push prior command packets (either via sequence ID or the PassPW bit), the source tag of the last command packet to be pushed when the command packet is received is recorded for that command packet. Node logic 224 may scan the command buffers for the source tag (and unit ID corresponding to the command packet). If the source tag and unit ID is found, then processing of the command packet may be suspended until the prior command is processed.

Additionally, node logic 224 is configured to forward a packet in the same direction (upstream or downstream) rather than according to a packet routing table (step 242). If the packet is targeted at this node, node logic 224 accepts the packet (removing the packet from the downstream flow) and processes the packet (step 240). It is noted that, once the command packet is processed (either forwarded or accepted by this node), the command packet is removed from the command buffer entry (and the data packet is removed from the data buffer entry, if applicable).

It is noted that, if a selected command packet specifies a corresponding data packet, various embodiments may process the command packet even if the data packet has not yet been received, or may await arrival of the data packet to simplify forwarding of the data or to allow another control packet which specifies a data packet which is complete to be forwarded on the same link. If the data packet has not been received when the command packet is processed, the data packet may be handled as described above when the data packet is received.

Figure 26:
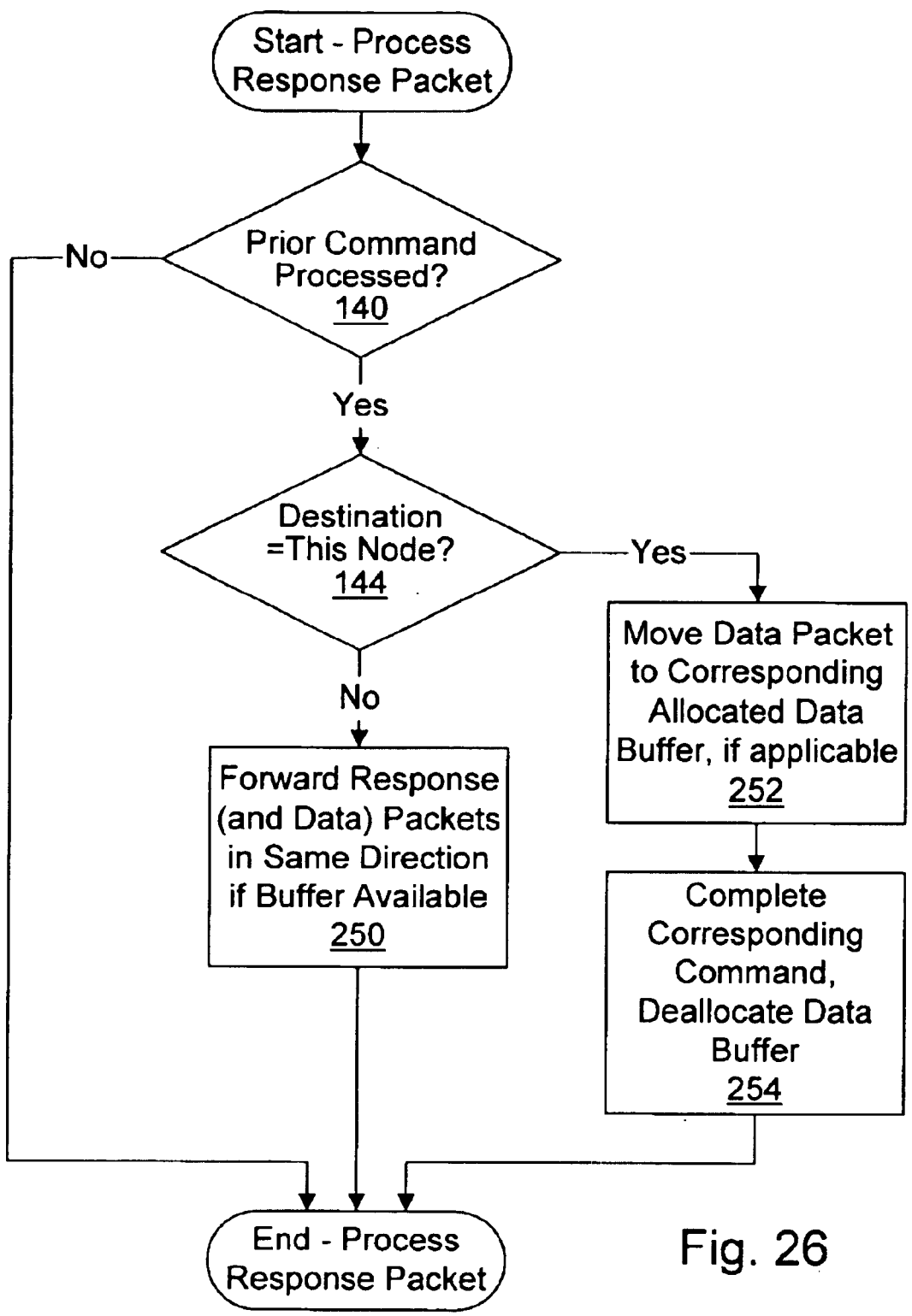
FIG. 26 is a flowchart illustrating operation of one embodiment of the node logic shown in FIG. 24 for processing a response packet.

Turning now to FIG. 26, a flowchart is shown illustrating operation of one embodiment of node logic 224 for processing a response packet. Other embodiments are possible and contemplated. While the steps shown in FIG. 26 are illustrated in a particular order for ease of understanding, any suitable order may be used. Additionally, steps may be performed in parallel using combinatorial logic within node logic 224. The steps illustrated in FIG. 26 may be performed in parallel and independently for each interface logic 18M–18N and/or each response packet buffer, since command packets from different interfaces and/or different virtual channels are physically independent.

Step 144 may be similar to the corresponding step of FIG. 16 (although based on unit IDs and unit ID registers 230A–230N for the node logic 224). Similar to the flowchart of FIG. 25, node logic 224 may implement an additional check prior to processing a response packet. In decision block 140, node logic 224 determines if the response packet is noted as pushing a prior command packet which has not been processed. As described above, if a command packet is received and is defined to push prior command packets (via the PassPW bit), the source tag of the last command packet to be pushed when the response packet is received is recorded for that response packet. Node logic 224 may scan the command buffers for the source tag (and unit ID corresponding to the response packet). If the source tag and unit ID is found, then processing of the response packet may be suspended until the prior command is processed.

If the destination node is another node, node logic 224 forwards the response packet (and corresponding data packet, if applicable) subject to a free buffer entry for the response virtual channel in the receiver on the link to which the response packet is forwarded (step 250). The receiver is the node which allows the response packet to flow in the same direction (upstream or downstream) as the packet was already flowing.

If the destination node of the response packet is this node, node logic 224 is configured to move the corresponding data packet, if any, from the corresponding response data buffer to the data buffer allocated to that response (step 252). In other words, node logic 224 consumes the data. Node logic 224 then completes the corresponding command, and deallocates the data buffer (step 254). It is noted that, once the response packet is processed (either forwarded or accepted by this node), the response packet is removed from the response buffer entry (and the data packet is removed from the data buffer entry, if applicable).

It is noted that, if a selected response packet specifies a corresponding data packet, various embodiments may process the response packet even if the data packet has not yet been received, or may await arrival of the data packet to simplify forwarding of the data or to allow another control packet which specifies a data packet which is complete to be forwarded on the same link. If the data packet has not been received when the response packet is processed, the data packet may be handled as described above when the data packet is received.

Figure 27:
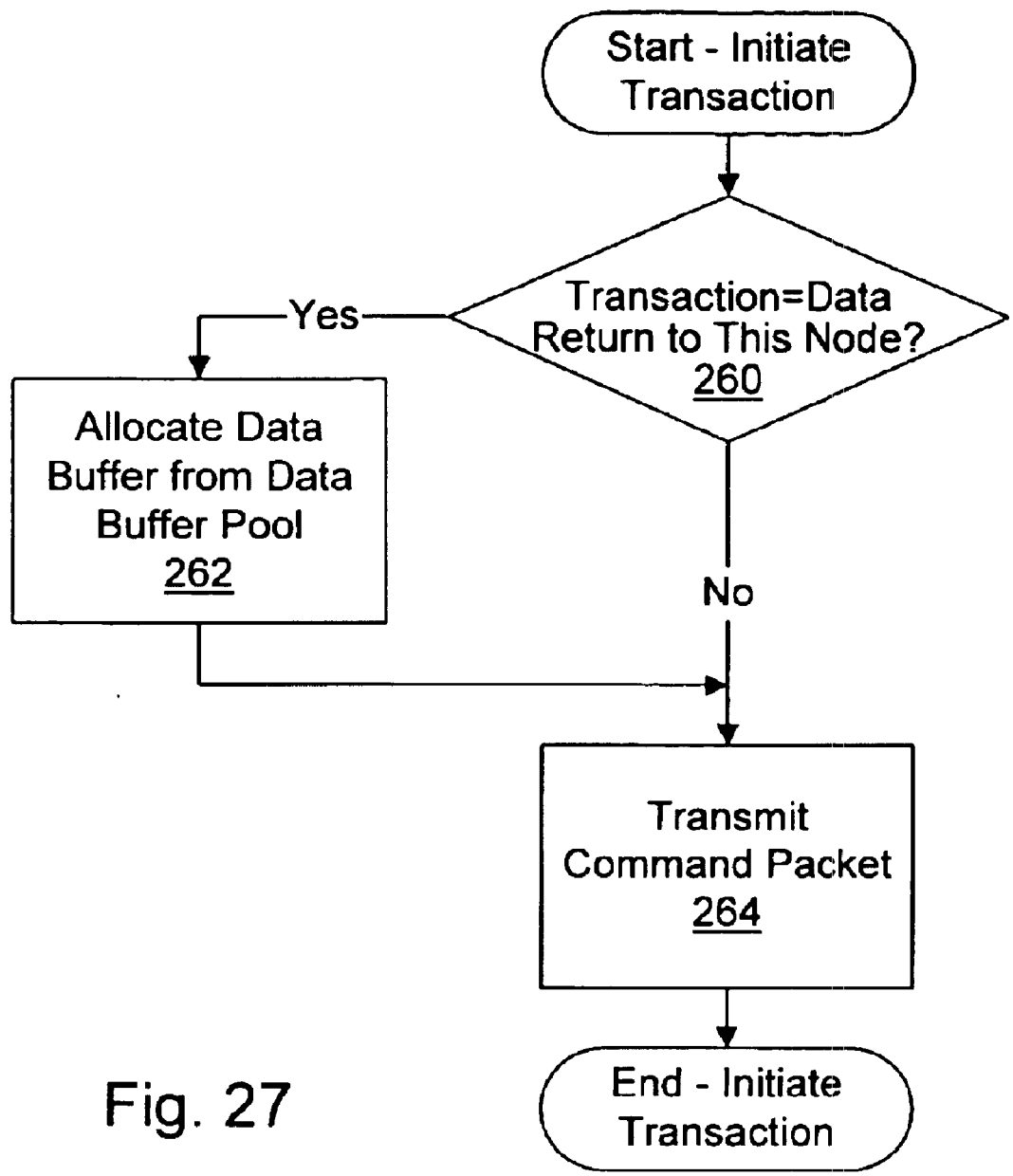
FIG. 27 is a flowchart illustrating operation of one embodiment of the node logic shown in FIG. 27 for initiating a packet.

Turning now to FIG. 27, a flowchart is shown illustrating operation of one embodiment of node logic for initiating a packet on the links to which the node is coupled. Other embodiments are possible and contemplated. While the steps shown in FIG. 27 are illustrated in a particular order for ease of understanding, any suitable order may be used. Additionally, steps may be performed in parallel using combinatorial logic within node logic 224.

Node logic 224 determines if the transaction to be initiated may result in data being return to this node (decision block 260). For example, read transactions initiated by the node cause data to be returned to the node, while write transactions initiated by the node do not cause data to be returned to the node. If the transaction may result in data being returned to this node, node logic 224 allocates a data buffer to store the returned data (step 262). Subsequently, node logic 224 transmits the packet (step 164).

Turning now to FIG. 28, a table 270 is shown illustrating operation of one embodiment of host bridge 202 in response to a pair of ordered commands received from a particular unit within the noncoherent fabric. The table includes a first command (or $CMD_1$) column listing the first command of the ordered pair, a second command (or CMD2) column listing the second command of the ordered pair, and a set of wait requirements indicating what the host bridge waits for in terms of the first command progressing in the coherent fabric before the second command may progress as indicated. Unless otherwise indicated in the table, the packets referred to in the table are packets on the coherent fabric. Also, combinations which are not listed have no wait requirements between them. Still further, table 270 is used only if host bridge 202 determines that there are ordering requirements between two commands. There may be ordering if the two commands have the same non-zero sequence ID, or if the first command is a posted write and the second command has the PassPW bit clear, for example. It is noted that, for entries which wait for TgtStart, reception of a corresponding TgtDone or RdResponse may be substituted (since TgtStart is an optional command).

In the first entry of table 270 (entry 272), a pair of ordered memory writes are completed by the host bridge by inhibiting transmission of the second memory write command until TgtStart for the first memory write command is received on the coherent fabric by the host bridge. Additionally, the host bridge withholds SrcDone for the second memory write until TgtDone for the first memory write is received. Finally, the TgtDone for the second memory write command on the noncoherent link (if the memory write is not posted) is inhibited until the TgtDone for the first memory write is received from the coherent fabric. The first entry has been explained as an example, the other entries are explained in a similar manner.

Host bridge 202 may implement the waits illustrated in table 270 and, along with providing a posted command virtual channel in the coherent fabric, the ordering requirements for posted writes (within the coherent fabric) may be met. The ordering requirements within the noncoherent fabric may be me using the PassPW bit as described above. As described with respect to FIG. 9, there are four requirements for posted writes on PCI:

(i) posted writes from the same source remain in order on the target interface;

(ii) posted writes followed by a read from the same source are completed on the target interface before the read data is returned;

(iii) non-posted writes remain ordered with posted writes from the same source; and (iv) non-posted operations followed by posted writes must be allowed to become unordered.

Requirement (i) is satisfied for posted writes to the same coherent node target by placing the posted writes in the posted command virtual channel, along with applying entry 272 to posted writes to different coherent node targets. Requirement (ii) may be satisfied using entry 274. Requirement (iii) may be satisfied using entry 272 as well. Finally, requirement (iv) may be satisfied by employing the posted commands virtual channel. Other entries within table 270 may be used to provide ordering of other types of commands within the coherent fabric (when sourced on the noncoherent link).

Numerous variations and modifications will become apparent to those skilled in the art once the above disclosure is fully appreciated. It is intended that the following claims be interpreted to embrace all such variations and modifications.

What is claimed is:

1. A method for routing packets among a plurality of nodes in a computer system, the method comprising:

receiving a first response packet in a first node of said plurality of nodes, said first node comprising a plurality of control packet buffers, each of said plurality of control packet buffers assigned to a different one of a plurality of virtual channels;

storing said first response packet in a response buffer which is one of said plurality of control packet buffers, said plurality of control packet buffers further including at least two additional control packet buffers corresponding to at least two additional virtual channels of said plurality of virtual channels, wherein said first response packet is a response to a first control packet belonging to one of said at least two additional virtual channels, and wherein said storing said first response packet in said response buffer is independent of which one of said at least two additional virtual channels said first control packet belongs to;

receiving a second response packet in said first node, said second response packet a response to a second control packet belonging to a different one of said at least two virtual channels from said first control packet; and storing said second response packet in said response buffer.

2. The method as recited in claim 1 wherein said at least two additional virtual channels include a non-posted command virtual channel.

3. The method as recited in claim 2 wherein said at least two additional virtual channels further include a probe virtual channel.

4. The method as recited in claim 1 further comprising:

receiving a first data packet specified by said first response packet; and storing said first data packet in a response data buffer, which is one of a plurality of data buffers included in said first node, said response data buffer assigned to said response virtual channel.

5. The method as recited in claim 4 further comprising:

receiving a second response packet in said first node, said second response packet a response to a second control packet belonging to a different one of said at least two virtual channels from said first control packet;

storing said second response packet in said response buffer;

receiving a second data packet specified by said second response packet; and storing said second data packet in said response data buffer.

6. The method as recited in claim 1 further comprising generating said first control packet in said first node.

7. The method as recited in claim 6 further comprising allocating space to process a plurality of response packets corresponding to said first control packet prior to transmitting said first control packet, said plurality of response packets including said first response packet.

8. The method as recited in claim 7 wherein said generating said first control packet comprises generating a probe packet in response to a second control packet received by said first node.

9. A computer system comprising:

a first node configured to transmit a first response packet; and a second node coupled to receive said first response packet from said first node, wherein said second node comprises:

a response buffer assigned to a response virtual channel;

a first control packet buffer assigned to a first virtual channel different from said response virtual channel; and a second control packet buffer assigned to a second virtual channel different from said response virtual channel and said first virtual channel;

wherein said response packet is a response to a first control packet belonging to one of said first virtual channel and said second virtual channel, and wherein said second node is configured to store said first response packet in said response buffer independent of which of said first virtual channel and said second virtual channel to which said first control packet belongs, and wherein said second node further comprises a response data buffer configured to store response data packets specified by response packets, and wherein said first node is configured to transmit a first response data packet specified by said first response packet, and wherein said second node is configured to store said first response data packet in said response data buffer.

10. The computer system as recited in claim 9, wherein said first node is configured to transmit a second response packet to said second node in response to a second control packet belonging to a different one of said first virtual channel and said second virtual channel from said first control packet, and wherein said second node is configured to store said second response packet in said response buffer.

11. The computer system as recited in claim 9, wherein said first virtual channel is a non-posted command virtual channel and said second virtual channel is a probe virtual channel.

12. The computer system as recited in claim 9 wherein said first node is configured to transmit a second response packet to said second node in response to a second control packet belonging to a different one of said first virtual channel and said second virtual channel from said first control packet, and wherein said second node is configured to store said second response packet in said response buffer, and wherein said first node is configured to transmit a second response data packet specified by said second response packet, and wherein said second node is configured to store said second response data packet in said response data buffer.

13. The computer system as recited in claim 9 wherein said second node is configured to generate said first control packet.

14. The computer system as recited in claim 13 wherein said second node is configured to allocate a buffer to store processed data from processing a plurality of response packets corresponding to said first control packet, said second node configured to allocate said buffer prior to transmitting said first control packet, and wherein said plurality of response packets includes said first response packet.

15. The computer system as recited in claim 14 wherein said first control packet comprises a probe packet generated in response to a second control packet received by said second node.

16. A computer system comprising:
a first node configured to transmit a first command packet in a first virtual channel of a plurality of virtual channels; and
a second node coupled to receive said first command packet, wherein said second node is configured to generate a first response packet in response to said first command packet and is further configured to transmit said first response packet using a response virtual channel of said plurality of virtual channels independent of which one of said plurality of virtual channels is said first virtual channel, and wherein the first node is configured to transmit a second command packet in a second virtual channel of the plurality of virtual channels, and wherein the second node is coupled to receive the second command packet and is configured to generate a second response packet in response to the second command packet, and wherein the second node is configured to transmit the second response packet in the response virtual channel.

17. The computer system as recited in claim 16 wherein the plurality of virtual channels includes a non-posted command virtual channel and a probe virtual channel.

18. The computer system as recited in claim 16 wherein the first response packet specifies a first response data packet, and wherein the second node is configured to transmit the first response data packet in the response virtual channel.

19. The computer system as recited in claim 16 wherein the first node is configured to allocate resources to process one or more response packets corresponding to the first command packet prior to transmitting the first command packet, wherein the one or more response packets includes the first response packet.

20. A node comprising:
one or more response buffers assigned to a response virtual channel;
one or more first control packet buffers assigned to a first virtual channel different from said response virtual channel; and
one or more second control packet buffers assigned to a second virtual channel different from said response virtual channel and said first virtual channel;
wherein, in response to receiving a first response packet that is a response to a first control packet belonging to one of said first virtual channel and said second virtual channel, the node is configured to store said first response packet in said response buffers independent of which of said first virtual channel and said second virtual channel to which said first control packet belongs, and wherein said node further comprises one or more response data buffers configured to store response data packets specified by response packets, and wherein, in response to receiving a first response data packet specified by said first response packet, said node is configured to store said first response data packet in said response data buffers.

21. The node as recited in claim 20 wherein said node, in response to receiving a second response packet that is a response to a second control packet belonging to a different one of said first virtual channel and said second virtual channel from said first control packet, is configured to store said second response packet in said response buffers.

22. The node as recited in claim 20 wherein said first virtual channel is a non-posted command virtual channel and said second virtual channel is a probe virtual channel.

23. The node as recited in claim 20 wherein in response to receiving a second response packet received in response to a second control packet belonging to a different one of said first virtual channel and said second virtual channel from said first control packet, said node is configured to store said second response packet in said response buffers, and wherein, in response to receiving a second response data packet specified by said second response packet, said node is configured to store said second response data packet in said response data buffers.

24. The node as recited in claim 20 wherein said node is configured to generate said first control packet.

25. The node as recited in claim 24 wherein said node is configured to allocate a buffer to store processed data from processing a plurality of response packets corresponding to said first control packet, said node configured to allocate said buffer prior to transmitting said first control packet, and wherein said plurality of response packets includes said first response packet.

26. The node as recited in claim 25 wherein said first control packet comprises a probe packet generated in response to a second control packet received by said node.

27. A node configured to implement a plurality of virtual channels for communicating with other nodes, wherein the plurality of virtual channels comprise at least a response virtual channel, a first virtual channel, and a second virtual channel and wherein the node comprising comprises circuitry that is configured to transmit response packets only in the response virtual channel, the response packets generated by the node in response to packets in any of the plurality of virtual channels that are defined to cause a response packet, wherein at least one packet assigned to the first virtual channel is defined to cause a response packet and at least one packet assigned to the second virtual channel is defined to cause a response packet.

28. The node as recited in claim 27 wherein the node comprises a plurality of control packet buffers, each of the control packet buffers assigned to one of the plurality of virtual channels, wherein the circuitry is configured to store the response packets in one of the plurality of control packet buffers assigned to the response virtual channel.

29. The node as recited in claim 28 wherein at least some of the response packets specify corresponding data packets, and wherein the node comprises a plurality of data buffers include a response data buffer, and wherein the node is configured to store the corresponding data packets in the response data buffer.

30. The node as recited in claim 27 wherein at least some of the response packets specify corresponding data packets, and wherein the node is configured to transmit the corresponding data packets in the response virtual channel.

31. The node as recited in claim 27 wherein packets that are defined to cause a response packet comprise non-posted command packets.

32. The node as recited in claim 31 wherein non-posted command packets comprise read command packets and write command packets.

33. The node as recited in claim 27 wherein packets that are defined to cause a response packet comprise probe packets.

34. A computer system comprising a plurality of nodes configured to communicate using a plurality of virtual channels, wherein the plurality of virtual channels comprise at least a response virtual channel, a first virtual channel, and a second virtual channel, and wherein a first node of the plurality of nodes is configured to transmit response packets only in the response virtual channel, the response packets generated by the first node in response to receiving packets from other ones of the plurality of nodes in any of the plurality of virtual channels, the response packets generated by the first node in response to packets that are defined to cause a response packet, wherein at least one packet assigned to the first virtual channel is defined to cause a response packet and at least one packet assigned to the second virtual channel is defined to cause a response packet.

35. The computer system as recited in claim 34 wherein at least some of the response packets specify corresponding data packets, and wherein the first node is configured to transmit the corresponding data packets in the response virtual channel.

36. The computer system as recited in claim 34 wherein packets that are defined to cause a response packet comprise non-posted command packets.

37. The computer system as recited in claim 36 wherein non-posted command packets comprise read command packets and write command packets.

38. The computer system as recited in claim 34 wherein packets that are defined to cause a response packet comprise probe packets.

39. The computer system as recited in claim 34 wherein a second node, prior to transmitting a first packet in one of the plurality of virtual channels, is configured to allocate space to store a plurality of response packets that are to be generated in response to the first packet.

* * * * *

UNITED STATES PATENT AND TRADEMARK OFFICE
CERTIFICATE OF CORRECTION

PATENT NO. : 6,888,843 B2
DATED : May 3, 2005
INVENTOR(S) : James B. Keller and Derrick R. Meyer It is certified that error appears in the above-identified patent and that said Letters Patent is hereby corrected as shown below:

<u>Column 34,</u>
Line 59, in-between "the node" and "comprises", please delete "comprising".

Signed and Sealed this

Sixteenth Day of August, 2005

JON W. DUDAS
*Director of the United States Patent and Trademark Office*